United States Patent
Obayashi et al.

(10) Patent No.: US 10,560,601 B2
(45) Date of Patent: Feb. 11, 2020

(54) IMAGE PROCESSING METHOD, IMAGE PROCESSING APPARATUS, AND STORAGE MEDIUM

(71) Applicant: CANON KABUSHIKI KAISHA, Tokyo (JP)

(72) Inventors: Masaaki Obayashi, Kawasaki (JP); Shinjiro Hori, Yokohama (JP); Hiroyasu Kunieda, Yokohama (JP); Ryosuke Iguchi, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 131 days.

(21) Appl. No.: 15/832,344

(22) Filed: Dec. 5, 2017

(65) Prior Publication Data

US 2018/0167532 A1     Jun. 14, 2018

(30) Foreign Application Priority Data

Dec. 9, 2016   (JP) .................................. 2016-239741

(51) Int. Cl.
  *H04N 1/387*   (2006.01)
  *H04N 1/00*    (2006.01)
  (Continued)

(52) U.S. Cl.
  CPC ......... *H04N 1/387* (2013.01); *G06K 9/00677* (2013.01); *G06K 9/00684* (2013.01); *G06K 9/4604* (2013.01); *G06T 11/60* (2013.01); *G11B 27/34* (2013.01); *H04N 1/00161* (2013.01); *H04N 1/00196* (2013.01);
  (Continued)

(58) Field of Classification Search
  CPC combination set(s) only.
  See application file for complete search history.

(56) References Cited

U.S. PATENT DOCUMENTS

| 8,730,397 B1 | 5/2014 | Zhang |
| 8,958,662 B1 | 2/2015 | Grosz et al. |

(Continued)

FOREIGN PATENT DOCUMENTS

| CN | 1458625 A | 11/2003 |
| EP | 3128733 A1 | 2/2017 |

(Continued)

OTHER PUBLICATIONS

Pere Obrador and Nathan Moroney—XP030081740—Automatic Image Selection by means of a Hierarchical Scalable Collection Representation, Issued Jan. 2009, SPIE-IS&T, vol. 7257, pp. 72570W-1 to 72570W-12.

(Continued)

*Primary Examiner* — Tsung Yin Tsai
(74) *Attorney, Agent, or Firm* — Canon USA, Inc., IP Division

(57) ABSTRACT

A technique for laying out images included in a plurality of image groups into which a plurality of images is divided in such a way that an image including an object of a type desired by a user is included in each of the image groups. A user instruction related to the object type is received, and a plurality of images is divided into image groups so that an image including an object corresponding to the object type is included in each of the plurality of image groups.

22 Claims, 13 Drawing Sheets

(51) Int. Cl.
  *G06K 9/46* (2006.01)
  *G06K 9/00* (2006.01)
  *G06T 11/60* (2006.01)
  *G11B 27/34* (2006.01)
  *G06K 9/62* (2006.01)

(52) U.S. Cl.
  CPC ......... *G06K 9/00228* (2013.01); *G06K 9/627* (2013.01); *H04N 1/00167* (2013.01)

(56) References Cited

U.S. PATENT DOCUMENTS

| | | |
|---|---|---|
| 8,990,672 B1 | 3/2015 | Grosz et al. |
| 2006/0221779 A1 | 10/2006 | Matsushita et al. |
| 2008/0075338 A1* | 3/2008 | Muramatsu ............. G06T 11/60 382/118 |
| 2008/0256577 A1* | 10/2008 | Funaki ................ G06F 3/04815 725/44 |
| 2010/0214411 A1 | 8/2010 | Weinmann et al. |
| 2010/0272323 A1* | 10/2010 | Oya ................ G08B 13/19602 382/107 |
| 2011/0285748 A1* | 11/2011 | Slatter ..................... G06T 11/60 345/629 |
| 2012/0020648 A1 | 1/2012 | Yamaji |
| 2012/0117473 A1 | 5/2012 | Han et al. |
| 2012/0236176 A1 | 9/2012 | Kita |
| 2013/0004073 A1* | 1/2013 | Yamaji .................... G06T 11/60 382/173 |
| 2014/0010454 A1* | 1/2014 | Fujita ...................... G06K 9/46 382/190 |
| 2014/0010463 A1* | 1/2014 | Kato .................... G06K 9/6202 382/218 |
| 2014/0010464 A1* | 1/2014 | Umeda ................ G06K 9/6267 382/224 |
| 2014/0013217 A1* | 1/2014 | Hashii ................... G06F 16/958 715/253 |
| 2014/0078177 A1 | 3/2014 | Yamaji et al. |
| 2014/0079322 A1 | 3/2014 | Yamaji |
| 2016/0259604 A1 | 9/2016 | Abe |
| 2016/0260460 A1* | 9/2016 | Abe ................... G06K 9/00684 |
| 2017/0046036 A1 | 2/2017 | Yokota |
| 2017/0186201 A1* | 6/2017 | Obayashi ................ G06T 11/60 |
| 2018/0157682 A1 | 6/2018 | Wakabayashi |

FOREIGN PATENT DOCUMENTS

| | | |
|---|---|---|
| JP | 2007-318461 A | 12/2007 |
| JP | 5449460 B2 | 3/2014 |

OTHER PUBLICATIONS

Sarah Perez—XP55461338—https://web.archive.org/web/20160409103917/http://techcrunch.com/2014/11/13/phototime-is-a-mobile-photo-gallery-capable-of-image-and-facial-recognition.
Jackie Dove—XP55461341—https://web.archive.org/web/20161013070555/https://thenextweb.com/creativity/2014/11/13/phototime-iphone-employs-image-recognition-automatically-tag-group-photos.

* cited by examiner

FIG.5

| IMAGE-CAPTURING DATE AND TIME | FOCUS | NUMBER OF FACES | PERSONAL ID ||||||||| OBJECT |
|---|---|---|---|---|---|---|---|---|---|---|---|
| | | | 1 ||| 2 ||| 3 ||| |
| | | | UPPER LEFT POSITION | LOWER RIGHT POSITION | ... | UPPER LEFT POSITION | LOWER RIGHT POSITION | ... | UPPER LEFT POSITION | LOWER RIGHT POSITION | ... | |
| 2015/7/1 10h11m12s | ○ | 6 | 40, 40 | 65, 65 | ... | 90, 40 | 115, 65 | ... | 10, 20 | 25, 35 | ... | — |
| 2015/7/1 10h12m30s | ○ | 2 | 50, 100 | 100, 150 | ... | 150, 125 | 190, 165 | ... | 150, 125 | 190, 165 | ... | FLOWER |
| 2015/7/1 10h15m54s | ○ | 0 | — | — | ... | — | — | ... | — | — | ... | DOG |
| ... | | | ... | ... | ... | ... | ... | ... | ... | ... | ... | ... |

FIG.7

| SCENE | IMAGE-CAPTURING PERIOD (HOURS) | | NUMBER OF CAPTURED IMAGES | | NUMBER OF CAPTURED PERSONS | |
|---|---|---|---|---|---|---|
| | AVERAGE | STANDARD DEVIATION | AVERAGE | STANDARD DEVIATION | AVERAGE | STANDARD DEVIATION |
| TRAVEL | 33.221 | 4.778 | 324.857 | 393.691 | 1.506 | 0.256 |
| DAY-TO-DAY LIVING | 3.336 | 4.671 | 54.892 | 108.805 | 1.465 | 0.974 |
| CEREMONY | 4.634 | 1.532 | 165.457 | 71.055 | 2.547 | 0.527 |

FIG.8A

| SCENE | MAIN SLOT IMAGE FEATURE | SUB SLOT IMAGE FEATURE |
|---|---|---|
| TRAVEL | LONG-SHOT IMAGE INCLUDING PERSON AND SCENERY | CLOSEUP OR PROFILE IMAGE |
| DAY-TO-DAY LIVING | CLOSEUP OR PROFILE IMAGE | LONG-SHOT IMAGE INCLUDING PERSON AND SCENERY |
| CEREMONY | IMAGE OF TWO PERSONS WITH SHORT DISTANCE THEREBETWEEN | IMAGE OF MANY PERSONS |

FIG.8B

| IMAGE ID | SCORE (50-POINT SCALE) | |
|---|---|---|
| | MAIN SLOT (POINTS) | SUB SLOT (POINTS) |
| 1 | 20 | 40 |
| 2 | 45 | 10 |
| 3 | 10 | 20 |
| ... | ... | ... |

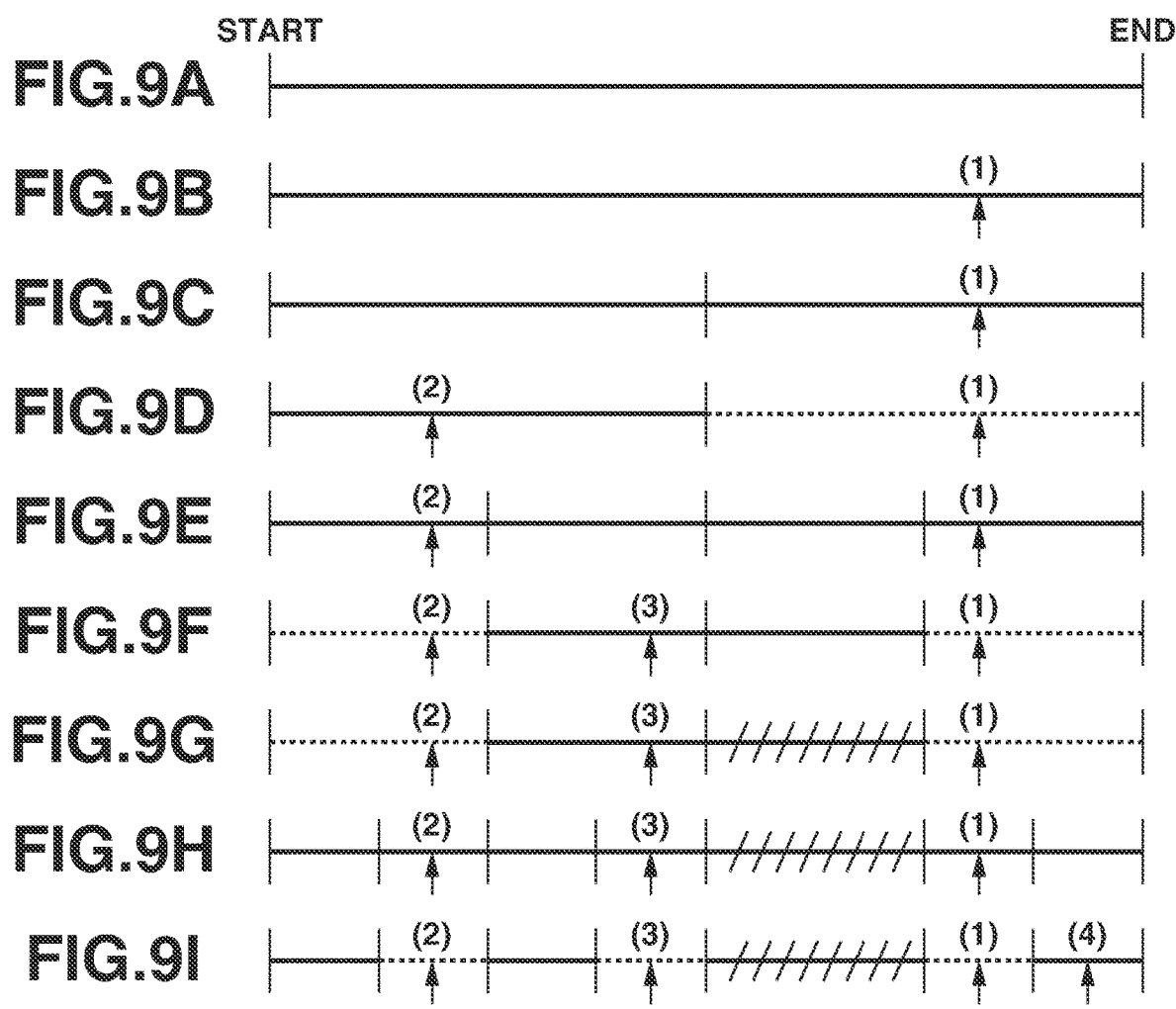

1002  1001  1003

1004

1006  1007  1005

IMAGE-CAPTURING DATE AND TIME

FIG.12A

| SCENE ID | SCENE INFORMATION ||||| DELETION TARGET | SCENE MERGING ID |
|---|---|---|---|---|---|---|---|
| | NUMBER OF IMAGES | NUMBER OF OBJECTS | IMPORTANCE LEVEL | PERIOD | TIME DIFFERENCE | | |
| 1 | 114 | 100 | 233 | 10hours:57minutes:54seconds | 7days:22hours:43minutes:54seconds | | 1 |
| 2 | 3 | 3 | 9 | 25seconds | 20hours:47minutes:21seconds | | 2 |
| 3 | 63 | 35 | 30 | 4hours:6minutes:20seconds | 10days:21hours:58minutes:36seconds | | 2 |
| 4 | 76 | 55 | 115 | 44minutes:38seconds | 12days:14hours:53minutes:26seconds | | 3 |
| 5 | 913 | 233 | 404 | 4days:7hours:22minutes:22seconds | 10days:18hours:33minutes:43seconds | | 4 |
| 6 | 13 | 13 | 26 | 3hours:1minute:27seconds | 15hours:12minutes:8seconds | | 5 |
| 7 | 15 | 10 | 23 | 2hours:10minutes:39seconds | 1day:10hours:55minutes:1second | | 6 |
| 8 | 3 | 3 | 4 | 14seconds | 20days:16hours:14minutes:44seconds | | 6 |
| 9 | 75 | 54 | 75 | 4hours:11minutes:11seconds | 19days:19hours:22minutes:39seconds | | 7 |
| 10 | 14 | 4 | 6 | 3hours:19minutes:5seconds | 2days:15hours:57minutes:21seconds | | 7 |
| 11 | 1 | 0 | 0 | 0seconds | 18days:4hours:2minutes:10seconds | * | — |
| 12 | 152 | 56 | 33 | 4hours:8minutes:15seconds | 5days:22hours:11minutes:48seconds | | 8 |
| 13 | 123 | 43 | 22 | 2hours:19minutes:58seconds | 20days:18hours:55minutes:15seconds | | 9 |
| 14 | 141 | 64 | 88 | 4hours:52minutes:13seconds | 0seconds | | 10 |

FIG. 12B

| SCENE ID | NUMBER OF IMAGES | NUMBER OF OBJECTS | IMPORTANCE LEVEL | SCENE INFORMATION | | DELETION TARGET | SCENE MERGING ID |
|---|---|---|---|---|---|---|---|
| | | | | PERIOD | TIME DIFFERENCE | | |
| 1 | 114 | 100 | 233 | 10hours:57minutes:54seconds | 7days:22hours:43minutes:54seconds | | |
| 2 | 66 | 38 | 39 | 4hours:6minutes:45seconds | 10days:21hours:58minutes:36seconds | | |
| 3 | 76 | 55 | 115 | 44minutes:38seconds | 12days:14hours:53minutes:26seconds | | |
| 4 | 913 | 233 | 404 | 4days:7hours:22minutes:22seconds | 10days:18hours:33minutes:43seconds | | |
| 5 | 13 | 13 | 26 | 3hours:1minute:27seconds | 15hours:12minutes:8seconds | | |
| 6 | 18 | 13 | 27 | 2hours:10minutes:53seconds | 20days:16hours:14minutes:44seconds | | |
| 7 | 75 | 54 | 75 | 7hours:30minutes:16seconds | 2days:15hours:57minutes:21seconds | | |
| 8 | 152 | 56 | 33 | 4hours:8minutes:15seconds | 5days:22hours:11minutes:48seconds | | |
| 9 | 123 | 43 | 22 | 2hours:19minutes:58seconds | 20days:18hours:55minutes:15seconds | | |
| 10 | 141 | 64 | 88 | 4hours:52minutes:13seconds | 0seconds | | |

IMAGE PROCESSING METHOD, IMAGE PROCESSING APPARATUS, AND STORAGE MEDIUM

BACKGROUND

Field of the Disclosure

The present disclosure generally relates to image processing and, more particularly, to an image processing method for laying out images on a template, an image processing apparatus, and a storage medium.

Description of the Related Art

Images captured by an image generation apparatus such as a digital camera, digital camcorder, and scanner, are output (displayed or printed) by various image output apparatuses such as a monitor and printer. A plurality of images may be output as an electronic album. When an electronic album is output, a plurality of images may be assigned to one double-page spread and output on the basis of a double-page spread. For example, when images are assigned to a plurality of double-page spreads, only laying out images on each double-page spread in order of image capturing may possibly lead to uncoordinated images on each double-page spread. Japanese Patent Application Laid-Open No. 2007-318461 discusses a technique for laying out images on the basis of a predetermined period, for example, on a daily or monthly basis.

When all images are divided on the basis of a predetermined period as in the technique discussed in Japanese Patent Application Laid-Open No. 2007-318461, an image of a subject desired by a user may not have been captured in a divided period.

SUMMARY

According to one or more aspects, the present disclosure relates to a technique for laying out images included in a plurality of image groups, into which a plurality of images is divided, in such a way that an image including an object of a type desired by a user is included in each one of the image groups. Therefore, according to one or more aspects of the present disclosure, an image processing method includes receiving a user instruction related to an object type, dividing a plurality of images into a plurality of image groups based on an object type corresponding to the received user instruction and on time information indicating a time corresponding to each of the plurality of images, and laying out at least one image included in each of the plurality of image groups into which the plurality of images is divided in the dividing on each of templates corresponding to each of the plurality of image groups. In the dividing, the plurality of images is divided so that an image including an object corresponding to the object type is included in each of the plurality of image groups.

Further features of the present disclosure will become apparent from the following description of exemplary embodiments with reference to the attached drawings.

BRIEF DESCRIPTION OF THE DRAWINGS

FIG. 5 illustrates image analysis information according to one or more aspects of the present disclosure.

FIG. 7 illustrates average values and standard deviations for each scene according to one or more aspects of the present disclosure.

FIGS. 8A and 8B illustrate a concept of a scoring axis according to one or more aspects of the present disclosure.

FIGS. 9A to 9I illustrate selection of image data according to one or more aspects of the present disclosure.

FIGS. 12A and 12B illustrate scene information about each scene according to one or more aspects of the present disclosure.

DESCRIPTION OF THE EMBODIMENTS

Figure 1:
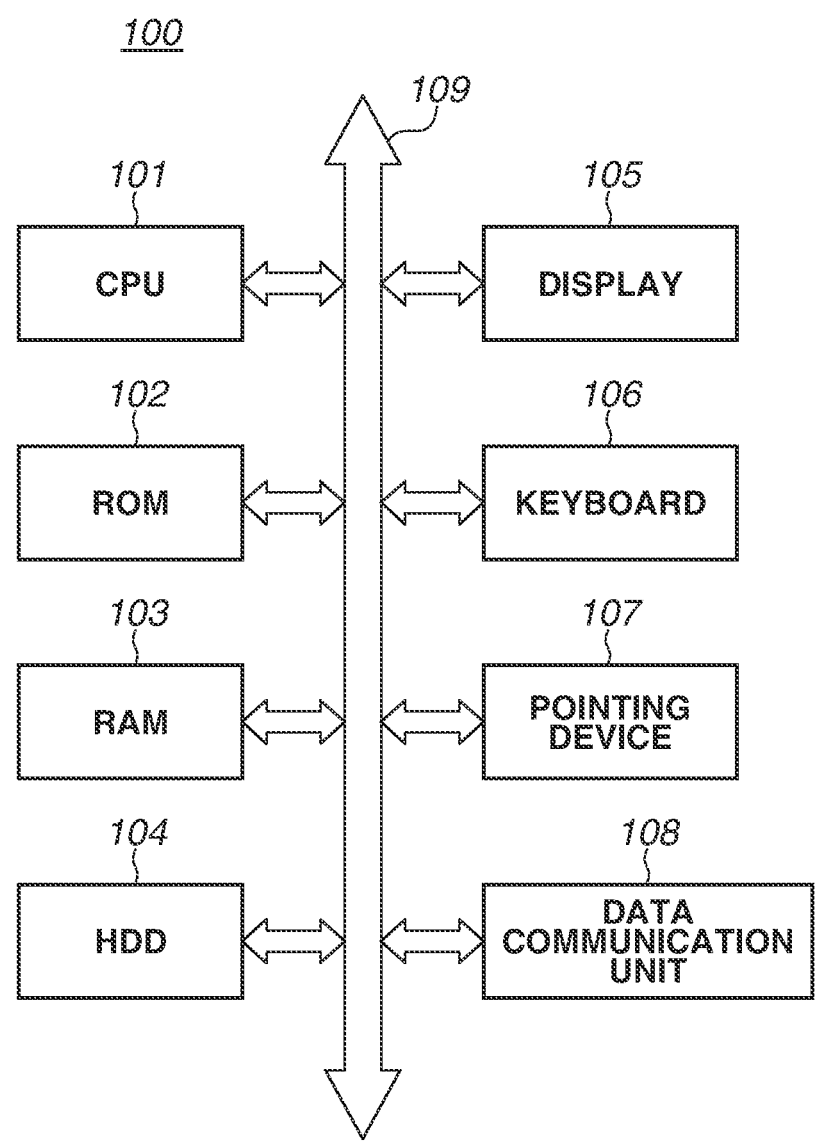
FIG. 1 is a block diagram illustrating a hardware configuration of an image processing apparatus according to one or more aspects of the present disclosure.

Various exemplary embodiments, features, and aspects of the present disclosure will be described in detail below with reference to the accompanying drawings. The following exemplary embodiments do not limit the present disclosure to the scope of the appended claims. Not all of the combinations of the features described in the present exemplary embodiments are indispensable to the solutions of the present disclosure. The same reference numerals are assigned to identical components, and duplicated descriptions thereof will be omitted.

The present exemplary embodiments will be described below centering on processing on an image processing apparatus for operating an album creation application and generating a layout by using an automatic layout function.

FIG. 1 is a block diagram illustrating a hardware configuration of the image processing apparatus according to one or more aspects of the present disclosure. Examples of the image processing apparatus include a personal computer (PC) and a smart phone. A PC may be used as an image processing apparatus in the present exemplary embodiment. A central processing unit/processor (CPU) 101, which may include one or more processors, one or more memories, circuitry, firmware, hardware, other component, or the like, may totally control an image processing apparatus 100. For example, the CPU 101 may read one or more programs, instructions, codes, or the like, stored in a read only memory (ROM) 102 into a random access memory (RAM) 103 and then execute the programs, instructions, codes, or the like, to implement operations of the present exemplary embodiment. Although the image processing apparatus 100 illustrated in FIG. 1 includes one CPU, the image processing apparatus 100 may include a plurality of CPUs. The ROM 102 is a general-purpose ROM which stores, for example, programs to be executed by the CPU 101. The RAM 103 is a general-purpose RAM which is used as, for example, a working memory for temporarily storing various information when the CPU 101 executes a program. A hard disk drive (HDD) 104 is a storage medium (storage unit) for storing a database for holding image files and processing results of image analysis and the like, and storing templates to be used by the album creation application.

A display 105 displays to a user an electronic album as a user interface (UI) or image layout results according to the present exemplary embodiment. A keyboard 106 and a pointing device 107 receive an instructing operation from the user. The display 105 may have a touch sensor function. The keyboard 106 is used, for example, to input the number of double-page spreads of the album which the user wants to create on the UI displayed on the display 105. The pointing device 107 is used by the user, for example, to click a button on the UI displayed on the display 105.

A data communication unit 108 performs communication with an external apparatus through a wired or wireless network. The data communication unit 108 transmits data laid out by the automatic layout function to a printer and server capable of communicating with the image processing apparatus 100. A data bus 109 connects the blocks illustrated in FIG. 1 so that they can communicate with each other.

The album creation application according to the present exemplary embodiment is stored in the HDD 104, and is activated when the user double-clicks the icon of the application displayed on the display 105 by using the pointing device 107 (described below).

Figure 2:
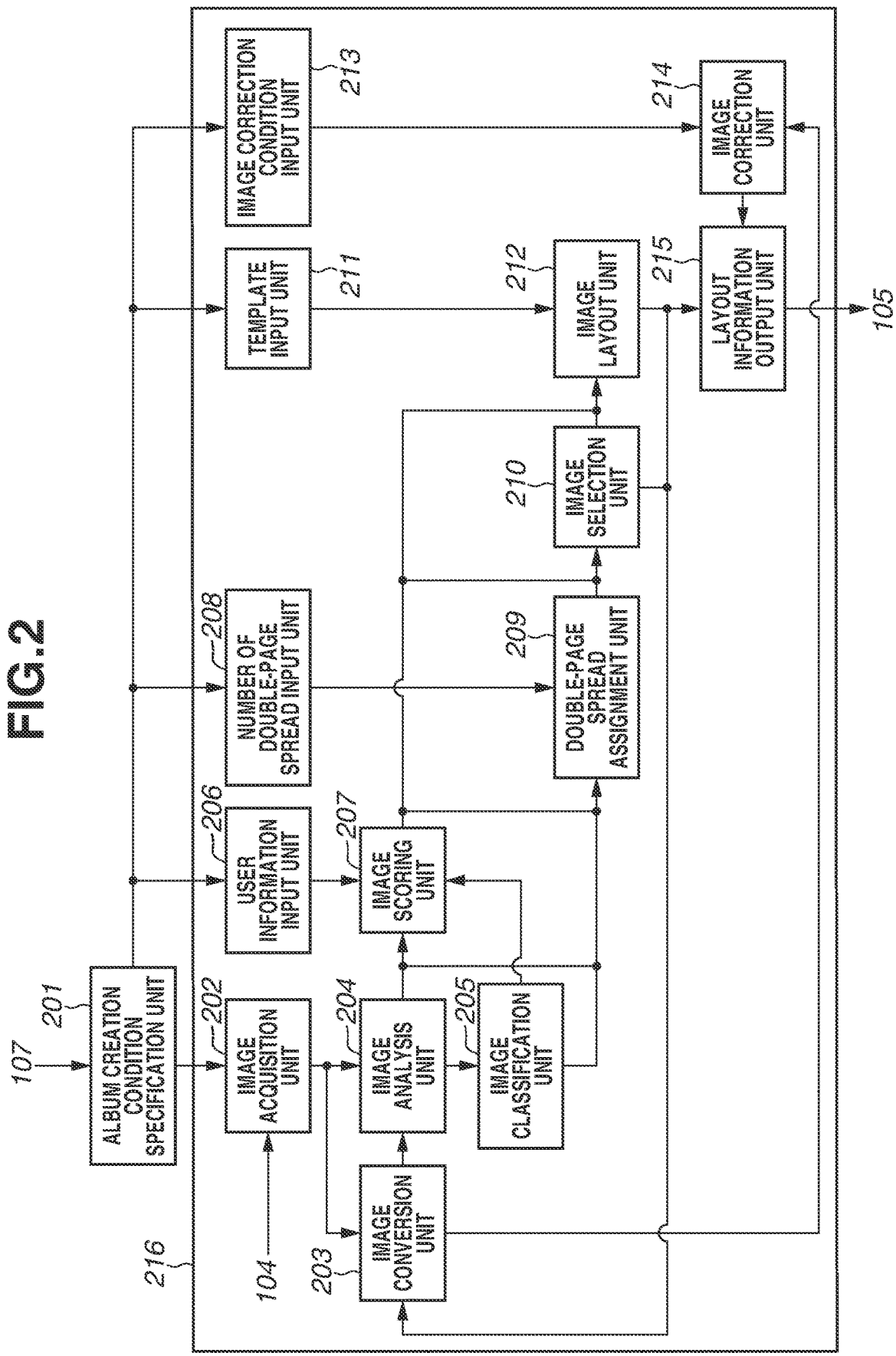
FIG. 2 is a block diagram illustrating a software configuration of an album creation application according to one or more aspects of the present disclosure.

FIG. 2 is a block diagram illustrating a software configuration of the album creation application. Program modules corresponding to the components illustrated in FIG. 2 are included in the above-described album creation application. The CPU 101 may function as each of the components illustrated in FIG. 2 when the CPU 101 executes each program module. Each of the components illustrated in FIG. 2 will be described below on the premise that each of the components performs various processing. In particular, FIG. 2 is a block diagram illustrating a software configuration of an automatic layout processing unit 216 for performing the automatic layout function.

The units described throughout the present disclosure are exemplary and/or preferable modules for implementing processes described in the present disclosure. The modules can be hardware units (such as circuitry, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

An album creation condition specification unit 201 determines album creation conditions according to a UI operation of the user (described below) with the pointing device 107, and outputs the determined album creation conditions to the automatic layout processing unit 216.

An image acquisition unit 202 acquires from the HDD 104 an image data group specified by the album creation condition specification unit 201. An image conversion unit 203 converts image data to be used for subsequent processing into image data having a desired number of pixels and color information. According to the present exemplary embodiment, the image conversion unit 203 converts the image data into analysis image data including 420 pixels in a short side and sRGB color information. The image analysis unit 204 performs processing of feature quantity acquisition, face detection, facial expression recognition, personal recognition, and object recognition (described below) based on the analysis image data. The image analysis unit 204 also performs the acquisition of data accompanying the image data acquired from the HDD 104, for example, the acquisition of image-capturing date and time (time information) from the Exif information. An image classification unit 205 performs scene division and scene classification (described below) on the image data groups based on the image-capturing date and time information, the number of captured images, and the detected face information. Scenes include those scenes in which images are captured, such as travel scenes, day-to-day living scenes, and marriage ceremony scenes. According to the present exemplary embodiment, a plurality of images is divided into a plurality of image groups based on the time information. A plurality of images collectively captured in a block of time is included in the same image group. Therefore, a plurality of images included in the same image group can be considered to be images that have been captured in the same scene or a similar scene.

An image scoring unit 207 performs scoring on each piece of image data so that an image suitable for layout has a high score. As described below, the image scoring unit 207 performs scoring based on information indicating image analysis results from the image analysis unit 204 and classification information from the image classification unit 205.

A user information input unit 206 inputs to the image scoring unit 207 identification (ID) information about a main character specified by the album creation condition specification unit 201. The image scoring unit 207 is configured to give a higher score to image data including the main character ID input from the user information input unit 206. The user information input unit 206 also inputs to the image scoring unit 207 a priority mode specified by the album creation condition specification unit 201. The image scoring unit 207 is configured to give a higher score to image data including at least one object input from the user information input unit 206.

A double-page spread assignment unit 209 divides a plurality of images into a plurality of image groups, and assigns the plurality of image groups into which the plurality of images is divided to a plurality of double-page spreads of the album. A number of double-page spread input unit 208 inputs to the double-page spread assignment unit 209 the number of double-page spreads of the album specified by the album creation condition specification unit 201 and the priority mode specified by the user. The number of double-page spreads of the album is equivalent to the number of one or a plurality of templates on which a plurality of images is to be laid out.

The double-page spread assignment unit 209 divides a plurality of images into a plurality of image groups according to the input number of double-page spreads, and assigns some or all of the images included in each of the image groups to each double-page spread. The double-page spread assignment unit 209 also performs division and merging on a plurality of image groups so that the number of double-page spreads is equal to the number of the plurality of image groups. According to the present exemplary embodiment, the division and merging of a plurality of image groups are also referred to as scene division and scene merging, respectively. According to the present exemplary embodiment, the double-page spread assignment unit 209 performs the division and merging (scene division and scene merging) on the above-described plurality of image groups according to the priority mode specified by the user.

Based on the score given by the image scoring unit 207, an image selection unit 210 selects images, the number of which is equal to the number of slots specified by the album creation condition specification unit 201, from an image group assigned to a double-page spread by the double-page spread assignment unit 209.

An image layout unit 212 determines the layout of image data, such as a slot on which an image is to be laid out and an area of an image to be displayed on the slot. The template input unit 211 inputs to the image layout unit 212 a plurality of templates corresponding to template information specified by the album creation condition specification unit 201. The image layout unit 212 selects a template suitable for the images selected by the image selection unit 210 from a plurality of templates input by the template input unit 211 to determine the layout of the selected images. A layout information output unit 215 outputs layout information to be displayed on the display 105 according to the layout of the selected images determined by the image layout unit 212. The layout information is, for example, bit map data in which the image data of the images selected by the image selection unit 210 is laid out in the selected template.

An image correction unit 214 performs various types of correction processing such as dodging process correction (luminance correction), red-eye correction, and contrast correction. The image correction condition input unit 213 inputs to the image correction unit 214 the image correction ON/OFF conditions specified by the album creation condition specification unit 201. When the image correction condition is ON, the image correction unit 214 performs correction processing on the image data. When the image correction condition is OFF, the image correction unit 214 does not perform correction processing on the image data. According to the ON/OFF conditions, the image correction unit 214 performs corrections on the image data input from the image conversion unit 203. The number of pixels in the image data input from the image conversion unit 203 to the image correction unit 214 can be changed according to the size of the layout determined by the image layout unit 212.

When the album creation application is installed in the image processing apparatus 100, a starting icon is displayed on the top screen (desktop) of an operating system (OS) operating on the image processing apparatus 100. When the user double-clicks the starting icon displayed on the display 105 by using the pointing device 107, the program of the album creation application stored in the HDD 104 is loaded into the ROM 102. When the program stored in the ROM 102 is loaded into the RAM 103 and executed by the CPU 101, the album creation application is activated.

Figure 3:
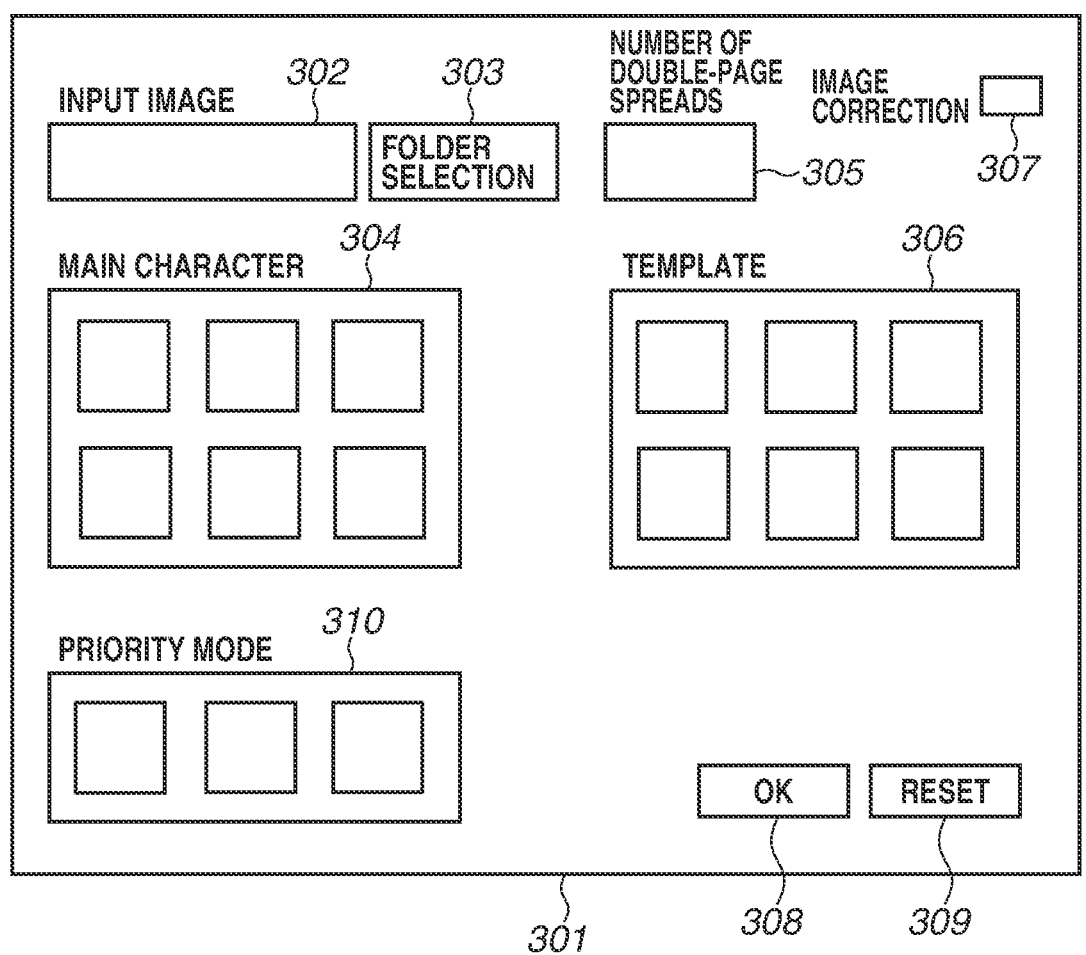
FIG. 3 illustrates a display screen provided by the album creation application according to one or more aspects of the present disclosure.

FIG. 3 illustrates an example of a display screen 301 provided by the album creation application. The display screen 301 is displayed on the display 105. The user sets album creation conditions (described below) via the display screen 301, and the album creation condition specification unit 201 acquires the album creation conditions set by the user.

A path box 302 on the display screen 301 displays a storage location (path) of a plurality of images (for example, a plurality of image files) to be used for creating an album in the HDD 104. When the user clicks a folder selection button 303 with the pointing device 107, a folder including an image to be used for creating an album is displayed in a tree structure to allow a user to select. The folder path of the folder selected by the user is displayed on the path box 302.

A main character specification icon 304 displays icons to be used by the user to specify a main character and displays face images of main characters as icons. Icons of a plurality of different face images are arranged and displayed on the main character specification icon 304. The user can select a face image by clicking an icon with the pointing device 107. A number of double-page spreads box 305 receives the setting of the number of double-page spreads of the album from the user. Then, the user inputs a number in the number of double-page spreads box 305 by directly inputting the number from the keyboard 106 or by selecting the number from the list with the pointing device 107.

A template specification icon 306 displays illustration images for templates of different tastes (such as popish and chic tastes). A plurality of template icons is arranged and displayed on the template specification icon 306 so that the user is able to select a template by clicking the icon with the pointing device 107. A check box 307 receives the image correction ON/OFF setting from the user. When the check box 307 is checked, the image correction is set to ON. When the check box 307 is not checked, the image correction is set to OFF.

A priority mode specification icon 310 displays icons (person, pet, and flower icons) for specifying a mode (photographic subject) to which the user wants to give priority. The user can select a desired icon displayed on the priority mode specification icon 310 by clicking the desired icon with the pointing device 107. The priority mode specification icon 310 accepts an important object type specified by the user. According to the present exemplary embodiment, the division and merging of image groups are performed so that the number of a plurality of image groups into which a plurality of images is divided is equal to the number of double-page spreads. In this case, the division or merging of image groups is performed so that a subject specified by the priority mode specification icon 310 is included in each image group after the division or merging. More specifically, the division or merging of image groups is performed so that there is no image group not including an image of a priority subject specified by the priority mode specification icon 310, and so that the image of the priority subject is included in image groups in a distributed way after the division or merging of image groups. The division and merging will be described in detail below.

When the user presses an OK button 308, the album creation condition specification unit 201 acquires the settings on the display screen 301. The album creation condition specification unit 201 outputs the acquired settings to the automatic layout processing unit 216 of the album creation application. In this case, the path input in the path box 302 is transferred to the image acquisition unit 202. The personal ID of the main character selected by the main character specification icon 304 and the priority mode specified by the priority mode specification icon 310 are transferred to the user information input unit 206, and are also transferred to the image scoring unit 207. The number of double-page spreads input in the number of double-page spreads box 305 and the priority mode specified by the priority mode specification icon 310 are transferred to the number of double-page spread input unit 208, and are also transferred to the double-page spread assignment unit 209.

The template information selected by the template specification icon 306 is transferred to the template input unit 211. The image correction ON/OFF setting of the check box 307 is transferred to the image correction condition input unit 213. A reset button 309 on the display screen 301 is used to reset the setting information on the display screen 301.

Figure 4:
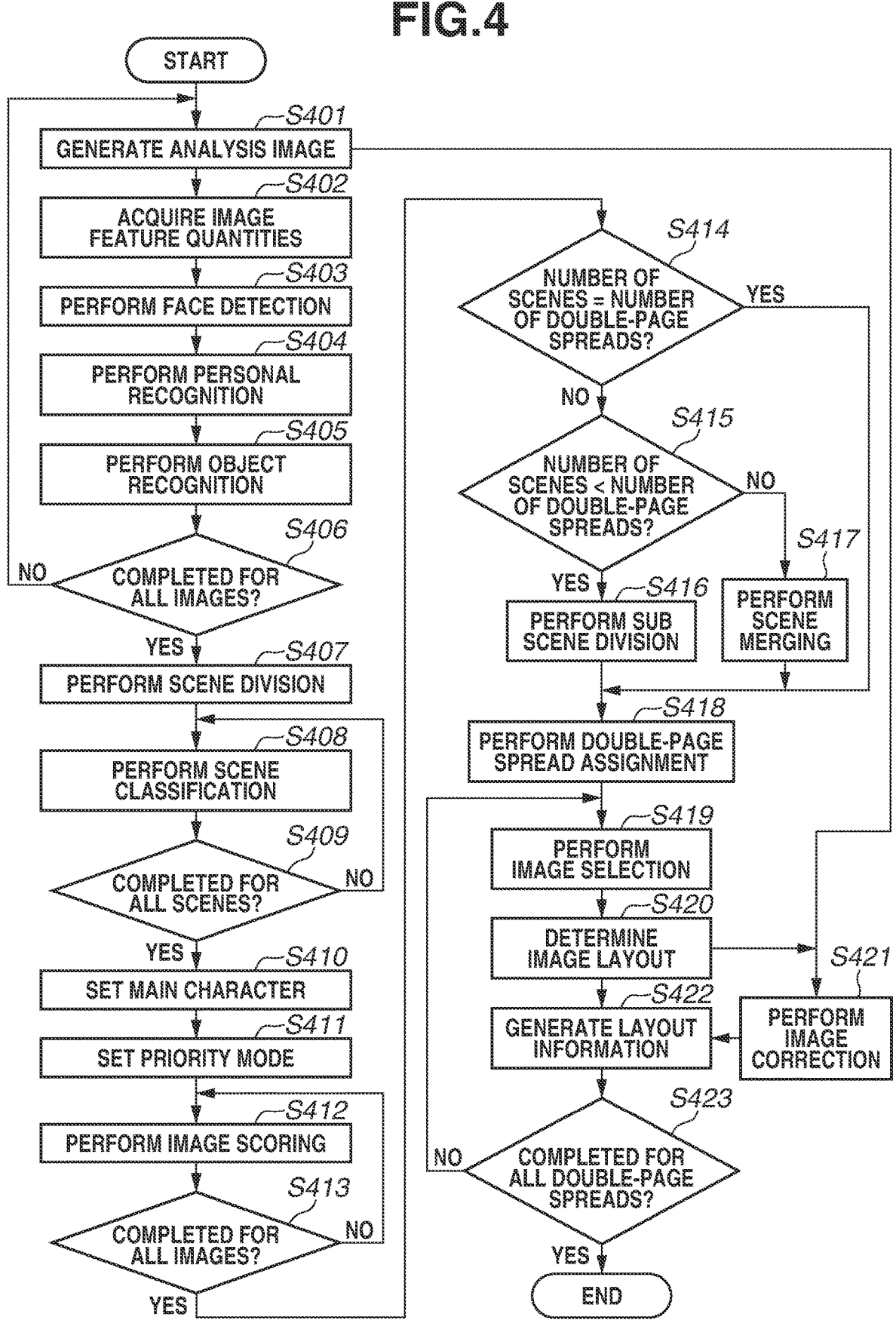
FIG. 4 is a flowchart illustrating automatic layout processing according to one or more aspects of the present disclosure.

FIG. 4 is a flowchart illustrating processing of the automatic layout processing unit 216 of the album creation application. The flowchart illustrated in FIG. 4 is implemented, for example, when the CPU 101 reads a program stored in the HDD 104 into the ROM 102 or RAM 103 and executes it. The description with reference to FIG. 4 is to be made on the premise that each of the components illustrated in FIG. 2 performs processing. Each of the components functions when the CPU 101 executes the above-described album creation application. Automatic layout processing will be described below with reference to FIG. 4.

In step S401, the image conversion unit 203 generates analysis image data. More specifically, the image conversion unit 203 identifies a plurality of image files stored in a folder in the HDD 104 specified by the album creation condition specification unit 201, and reads the plurality of specified image files from the HDD 104 into the RAM 103. Then, the image conversion unit 203 converts the image data of the read image files into analysis image data including the desired number of pixels and color information. According to the present exemplary embodiment, the image conversion unit 203 converts the image data into analysis image data with 420 pixels in a short side and sRGB color information.

In step S402, the image analysis unit 204 acquires image feature quantities. The image analysis unit 204 acquires the image-capturing date and time as time information about images in the image files, for example, from the Exif information accompanying the image files read from the HDD 104. The image analysis unit 204 also acquires feature quantities from the analysis image data generated in step S401. The feature quantities include the degree of focusing. Edge detection is performed to determine the degree of focusing. A Sobel filter is generally known as an edge detection method. The edge inclination is calculated by performing edge detection by using a Sobel filter and then dividing the luminance difference between the starting and ending points of an edge by the distance between the starting and ending points. Based on the result of calculating the average inclination of an edge in the image, an image having a larger average inclination is focused to a higher degree than an image having a smaller average inclination. Then, if a plurality of different threshold values is set for the inclination, an evaluation value of the focus amount can be output by determining which threshold value the inclination is equal to or larger. According to the present exemplary embodiment, two different threshold values are preset and the focus amount is determined in three steps (○, Δ, and x). For example, each threshold value is preset, determining a focus inclination applicable to the album as ○, determining a permissible focus inclination as Δ, and determining an impermissible focus inclination as x. For example, threshold value settings may be offered from the development source of the album creation application, or may be set on a user interface.

In step S403, the image analysis unit 204 performs face detection on the analysis image data generated in step S401. A known method can be used for face detection processing, and for example, Adaboost, in which a strong discriminator is generated from a plurality of weak discriminators, may be used. According to the present exemplary embodiment, a face image of a person (object) is detected by a strong discriminator that may be generated by Adaboost or the like. The image analysis unit 204 extracts the face image and at the same time acquires the upper left and lower right coordinate values of the position of the detected face image. These two different coordinates enable the image analysis unit 204 to acquire the position and size of the face image.

In step S404, the image analysis unit 204 compares the face image, detected in step S403 based on the analysis image data, in the image to be processed with a representative face image stored for each personal ID in a face dictionary database, thus performing personal recognition. The image analysis unit 204 identifies a representative face image having a similarity to the face image in the image to be processed being equal to or larger than the threshold value and having the highest similarity out of a plurality of representative face images. The personal ID corresponding to the identified representative face image is set as the ID of the face image in the image to be processed. The image analysis unit 204 performs the following processing on all of the plurality of representative face images. More specifically, when the similarity of a representative face image to the face image in the image to be processed is lower than the threshold value, the image analysis unit 204 recognizes the face image in the image to be as a new representative face image, associates the new representative face image with a new personal ID, and registers the face image in the face dictionary database.

In step S405, the image analysis unit 204 performs object recognition on the analysis image data generated in step S401. A known method can be used for object recognition processing. According to the present exemplary embodiment, an object is recognized by a discriminator generated by Deep Learning. The image analysis unit 204 recognizes an object image so that the object type, such as pet (dog and cat), flower, food, building, and carved ornament, can be acquired.

As illustrated in FIG. 5, the image analysis unit 204 stores in a storage area such as the ROM 102 the image analysis information acquired in steps S402 to S405 for each ID for identifying each image. For example, as illustrated in FIG. 5, the image-capturing date and time information and the focus determination result acquired in step S402, the number of face images and position information detected in step S403, and the object type recognized in step S405 are stored in tabular form. The position information on the face image is stored in such a way that the position information is distinguished for each personal ID acquired in step S404. When a plurality of types of objects has been recognized from one image, all of the plurality of types of objects are stored in the row corresponding to the one image in the table illustrated in FIG. 5.

In step S406, the CPU 101 determines whether the processing in steps S401 to S405 is completed for all of the images stored in the folder in the HDD 104 specified by the album creation condition specification unit 201. When the CPU 101 determines that the processing is not completed (NO in step S406), the processing returns to step S401. On the other hand, when the CPU 101 determines that the processing is completed (YES in step S406), the processing proceeds to step S407. More specifically, when the processing in steps S401 to S405 is repeatedly performed on all of the images stored in the specified folder, the table illustrated in FIG. 5 including information of all of the images is generated.

In step S407, the image classification unit 205 performs scene division for dividing all of the images stored in the specified folder into a plurality of image groups based on the time information. This division processing is temporary division processing for final division processing, and in the temporary division processing, the number of image groups does not need to coincide with the number of double-page spreads. The image classification unit 205 calculates the image-capturing time difference between images in the specified folder based on the image-capturing date and time information (time information) acquired in step S402. Then, based on the image-capturing time difference, the image classification unit 205 divides a plurality of images in the specified folder into a plurality of image groups (a plurality of scenes).

Figure 6A:
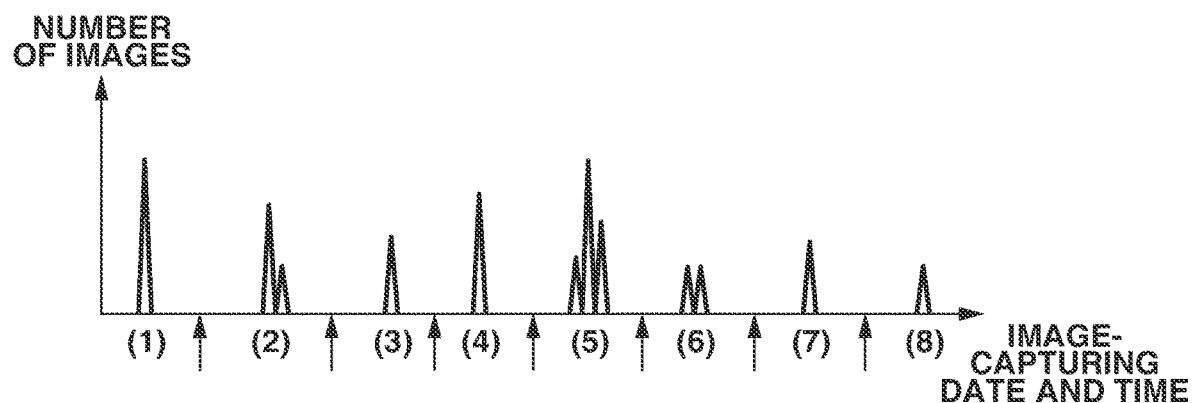
FIGS. 6A to 6C illustrate results of scene division performed on image data groups according to one or more aspects of the present disclosure.

According to the present exemplary embodiment, for example, the image classification unit 205 sorts a plurality of images in the specified folder in order of the image-capturing date and time to generate a list including image names (such as image file names) and image-capturing date and time in the RAM 103. With respect to two continuous images in the list, if the image-capturing dates corresponding to the two images are not continuous, the image classification unit 205 assigns the two images to different image groups. However, the division of the images into image groups may be performed based on other criteria. For example, even if the image-capturing dates of two continuous images are continuous in the above-described list, the two images may be assigned to different image groups. In this case, for example, as long as the image-capturing time difference between the two continuous images in the list, for example, is at least 16 hours, the two images are assigned to different image groups. Even if the image-capturing time difference is shorter than 16 hours, as long as the time difference between the first image-capturing time and the last image-capturing time is shorter than 4 hours in each of two continuous dates, a plurality of images captured on the two dates is divided into different image groups based on the date. If the time difference between the first image-capturing time and the last image-capturing time is 4 hours or longer in each of the two dates, the division is performed based on the date if the number of captured images on each date is smaller than 50 or the division is not performed if the number of captured images is 50 or more. FIG. 6A illustrates an example of a result of dividing a plurality of images included in the specified folder into a plurality of image groups with the above-described scene division method (result of performing the scene division). FIG. 6A illustrates image groups (scenes) (1) to (8). The vertical axis indicates the number of images in each image group, and the horizontal axis indicates the image-capturing date and time of each image group.

In step S408, the image classification unit 205 performs scene classification. According to the present exemplary embodiment, for example, the image classification unit 205 classifies image data in image groups, into which a plurality of images is divided according to the scenes, into any one of travel, day-to-day living, and ceremony scenes. Before the processing illustrated in FIG. 4 is started, the user has collected and specified a plurality of pieces of image data determined to be travel, day-to-day living, and ceremony scenes captured. The image classification unit 205 compares the image associated with each scene through the specification with images included in the image groups into which the plurality of images is divided in step S407 to identify the type of captured scene corresponding to each image group. This specific processing on the captured scene will be described below.

The specification of image data corresponding to the captured scene by the user will be described below. For example, on a user interface screen (not illustrated), the album creation condition specification unit 201 receives a specification of a plurality of pieces of image data determined to be travel scenes by the user. Then, the image analysis unit 204 acquires feature quantities of these pieces of image data. The feature quantities acquired in this case include the image-capturing period, the number of captured images, and the number of persons in captured images. The image-capturing period refers to the time difference between the first image-capturing time and the last image-capturing time of a plurality of pieces of image data specified as described above. The number of captured images refers to the number of captured images for a plurality of pieces of image data. The number of persons in the captured images is the number of faces in the captured images. As a result, feature quantities (the image-capturing period, the number of captured images, and the number of persons in the captured images) are acquired for one image data group including a plurality of pieces of image data determined to be travel scenes by the user.

Then, the image analysis unit 204 performs the acquisition of feature quantities (the image-capturing period, the number of captured images, and the number of persons in the captured images) also for other image data groups specified by the user. Then, based on the feature quantities acquired from the plurality of image data groups, the image analysis unit 204 obtains the average value and standard deviation of the image-capturing period, the average value and standard deviation of the number of captured images, and the average value and standard deviation of the number of persons in the captured images. FIG. 7 illustrates the obtained average values and standard deviations of each of the above-described feature quantities. The image analysis unit 204 pre-stores these values in a storage area such as the ROM 102. Alternatively, these values may be preset in the program of the album creation application.

The processing in step S408 illustrated in FIG. 4 will be described again below. After the album creation application is activated, the image classification unit 205 calculates the scores of the feature quantities (the image-capturing period, the number of captured images, and the number of persons in the captured images) for each image group into which the plurality of images is divided in step S407 through the scene division performed on the image data group specified in the path box 302 by the user. The image classification unit 205 calculates the scores of the image-capturing period, the number of captured images, and the number of persons in the captured images and the average score thereof for each image group, based on the formulas (1) and (2) by using the average value and standard deviation for each scene illustrated in FIG. 7.

$$\text{Score}=50-|10\times(\text{Average value}-\text{Feature quantity})/\text{Standard deviation}| \quad (1)$$

$$\text{Average score}=(\text{Score of image-capturing period}+\text{Score of number of captured images}+\text{Score of number of persons in the captured images})/\text{Number of items of feature quantities} \quad (2)$$

As a result of calculation, the average score for each of travel, day-to-day living, and ceremony scenes is calculated for image data in each image group. Then, the image classification unit 205 classifies image data in each image group into a scene corresponding to the highest score out of the above-described scores. If different scenes have the same score, the image classification unit 205 classifies the data according to a predetermined scene priority. For example, according to the present exemplary embodiment, priority is given to day-to-day living, ceremony, and travel scenes in this order, i.e., the priority of day-to-day living scenes is the highest. For example, referring to an image data group 5 after the scene division illustrated in FIG. 6A, the image-capturing period is 36 hours, the number of captured images is 300, and the number of persons in the captured images is 1.7. As a result of calculation based on the formulas (1) and (2), the average score of travel scenes is 45.32, the average score of day-to-day living scenes is 18.38, and the average score of ceremony scenes is −29.92. Therefore, the image data group 5 is classified into the travel scenes. The image classification unit 205 supplies classified scenes with a scene ID to manage them in such a way that they can be identified.

In step S409, the CPU 101 determines whether the scene classification in step S408 is completed for all of the image groups into which the plurality of images is divided in step S407. When the CPU 101 determines that the scene classification is not completed (NO in step S409), the processing returns to step S408. On the other hand, the CPU 101 determines that the scene classification is completed (YES in step S409), the processing proceeds to step S410.

In step S410, the image scoring unit 207 performs a main character setting. The main character setting is performed on a plurality of images in the folder specified by the user, with one of two (automatic and manual) setting methods. With the manual setting method, the user clicks the icon of the face image of a person displayed as the main character specification icon 304 illustrated in FIG. 3 with the pointing device 107 to select a desired main character. With the automatic setting method, the processing is performed as follows. Based on the result of the personal recognition performed in step S404 and the result of the scene division performed in step S407, the image scoring unit 207 can acquire the number of times each personal ID appears in the image data groups, the number of times each personal ID appears in each scene, and the number of scenes in which each personal ID appears. The image scoring unit 207 automatically sets the main character based on these pieces of information, not based on the user specification. According to the present exemplary embodiment, when there is a plurality of scenes, the image scoring unit 207 sets, as the main character ID, a personal ID having the largest number of times the personal ID appears in a plurality of scenes. When there is only one scene, the image scoring unit 207 sets, as the main character ID, a personal ID having the largest number of times the personal ID appears in a single scene.

Further, when the user specifies the main character specification icon 304, the user information input unit 206 informs the image scoring unit 207 of the specified personal ID. When the user specifies a personal ID, the image scoring unit 207 sets the personal ID specified by the user as the main character ID regardless of the above-described automatically set main character ID. This setting is referred to as a manual setting.

In step S411, the image scoring unit 207 performs a priority mode setting. The priority mode setting is performed on a plurality of images in the folder specified by the user, with one of two (automatic and manual) setting methods. With the manual setting method, the user clicks the priority mode specification icon 310 (person, pet, or flower icon) illustrated in FIG. 3 with the pointing device 107 to select a desired priority mode (subject type which should be given priority). With the automatic setting method, the processing is performed as follows. Based on the result of the object recognition performed in step S405, the image scoring unit 207 acquires the number of times each object type appears in the plurality of images. Likewise, the image scoring unit 207 can acquire the number of times each object appears in each image group (scene), and acquire the number of scenes in which each object type appears. The image scoring unit 207 automatically sets the priority mode based on these pieces of information, not based on the user specification. According to the present exemplary embodiment, when there is a plurality of image groups (scenes), the image scoring unit 207 sets, as the priority mode, a mode for giving priority to an object type having the largest number of times the object type appears in the plurality of image groups. When there is only single image group (scene), the image scoring unit 207 sets, as the priority mode, a mode for giving priority to an object type having the largest number of times the object type appears in the single image group.

Figure 10A:
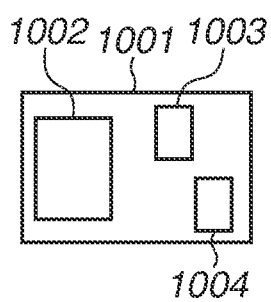
FIGS. 10A to 10Q illustrate a template group used for image data layout according to one or more aspects of the present disclosure.
Figure 10E:
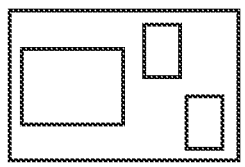
Figure 10I:
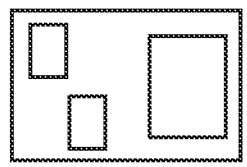
Figure 10M:
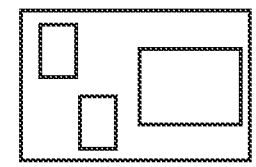
Figure 10B:
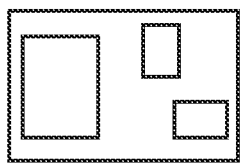
Figure 10F:
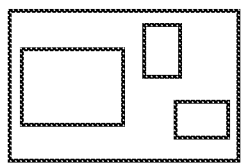
Figure 10J:
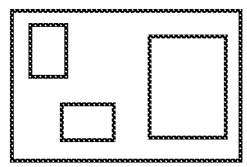
Figure 10N:
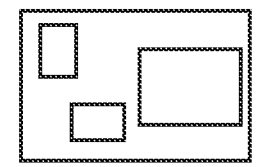
Figure 10C:
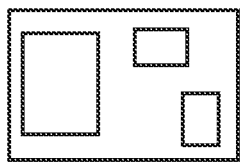
Figure 10G:
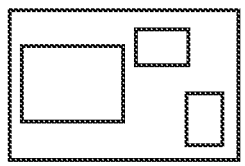
Figure 10K:
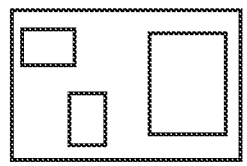
Figure 10O:
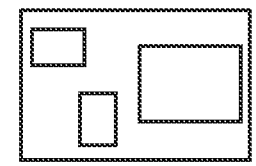
Figure 10D:
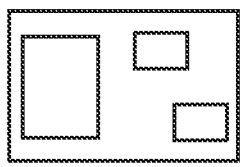
Figure 10H:
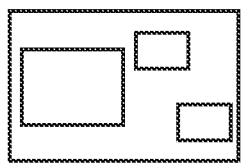
Figure 10L:
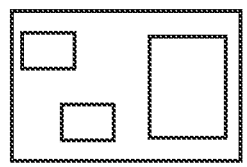
Figure 10P:
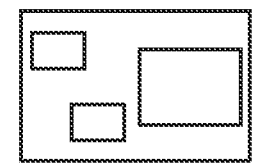
Figure 10Q:
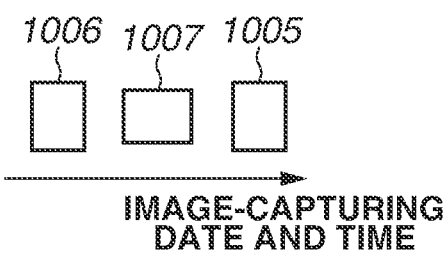

In step S412, the image scoring unit 207 performs scoring. Scoring refers to giving a score to be obtained as a result of evaluating each piece of image data from the below-described viewpoint. The score is referenced when the image data to be used for layout is selected. FIGS. 10A to 10Q illustrate a group of templates to be used for image data layout. Each of a plurality of templates included in the group of templates corresponds to each double-page spread. FIG. 10A illustrates a template 1001, a main slot 1002, and sub slots 1003 and 1004. The main slot 1002 serves as a main slot (a frame for laying out an image) within the template 1001, and is larger in size than the sub slots 1003 and 1004. The image scoring unit 207 gives both the score for the main slot and the score for the sub slot to each piece of image data.

FIG. 8A illustrates image features of the main slot and the sub slot to be adopted in an album according to captured scenes (travel, day-to-day living, and ceremony scenes). Before the processing illustrated in FIG. 4 is started, the user has collected and specified a plurality of pieces of image data determined to conform to features suitable for the main slot and features suitable for the sub slot for each scene illustrated in FIG. 8A. The image scoring unit 207 compares images associated with the main and sub slots by the specification with images included in each image group into which images are divided in step S407. This comparison enables giving a score to the conformity of each image to the main and sub slots. This scoring processing will be described below.

Specification performed by the user in advance will be described below. For example, on a user interface screen (not illustrated), the album creation condition specification unit 201 receives a specification of a plurality of pieces of image data determined to be suitable for the main slot (or sub slot) of the travel scene. The image analysis unit 204 acquires feature quantities including the number of faces, face positions, and face sizes for each piece of the specified image data. As a result, for example, feature quantities including the number of faces, face positions, and face sizes are acquired for each of a plurality of pieces of image data determined to be suitable for the main slot (or sub slot) of the travel scene. Then, the image analysis unit 204 obtains the average value and standard deviation of the number of faces, the average value and standard deviation of the face positions, the average value and standard deviation of the face sizes. The image analysis unit 204 obtains the average value and standard deviation as statistical values for each feature quantity for each scene and each slot type (main and sub slots) as described above. The image analysis unit 204 pre-stores these values in a storage area such as the ROM 102. These values may be preset in the program of the album creation application.

The image scoring unit 207 can acquire information about which scene each piece of image data belongs to, based on the result of the scene classification in step S408. The image scoring unit 207 calculates the average score by using the above-described pre-acquired average values and standard deviations corresponding to scenes of the target image data, and feature quantities (the number of faces, face position, and face size) of the main character ID of the target image data, based on the formulas (3) and (4).

Score=50−|10×(Average value−Feature quantity)/Standard deviation|  (3)

Average score=(Score of number of faces+Score of face position+Score of face size)/Number of items of feature quantities  (4)

The image scoring unit 207 performs the above-described scoring on images for both the main and sub slots. Since it is more desirable that an image to be used for the album is in focus, a predetermined score may be added to the image data of the image ID with which the focus feature quantity illustrated in FIG. 5 is ○. FIG. 8B illustrates an example of a scoring result by the above-described scoring in which scoring is made on the main and sub slots of each image ID.

More specifically, according to the present exemplary embodiment, conditions suitable for the main and sub slots are defined for each scene as illustrated in FIG. 8A. The user specifies image data determined to be suitable for these slots in advance. The image analysis unit 204 acquires feature quantities (the number of faces, face position, and face size) of the image data specified by the user and obtains the average value and standard deviation of each of the feature quantities in advance. After the album creation application is activated, scoring (similarity setting) is performed when the automatic layout processing illustrated in FIG. 4 is started. Scoring refers to how each piece of image data (on which the scene classification has already been performed) on which the automatic layout processing is to be performed is close to the user's criterion, for example, the suitability for the main slot. For example, referring to FIG. 8B, an image ID 1 is given 20 points as image data for the main slot, and an image ID 2 is given 45 points as image data for the main slot. This indicates that, as image data for the main slot, the image ID 2 is closer to the user's criterion than the image ID 1.

The flowchart illustrated in FIG. 4 will be described again below. In step S413, the image scoring unit 207 determines whether the image scoring in step S412 is completed for all of the images in the folder specified by the user. When the image scoring unit 207 determines that the image scoring is not completed (NO in step S413), the processing returns to step S412. On the other hand, when the image scoring unit 207 determines that the image scoring is completed (YES in step S413), the processing proceeds to step S414.

According to the present exemplary embodiment, the image layout unit 212 lays out images included in each of a plurality of scenes on each of a plurality of templates (a plurality of double-page spreads) corresponding to each of the plurality of scenes. Therefore, the number of the plurality of scenes needs to coincide with the number of the plurality of templates (a predetermined number of double-page spreads).

In step S414, the double-page spread assignment unit 209 determines whether the number of scenes in the scene division in step S407 (the number of image groups into which images are divided) is the same as the number of double-page spreads of the album input from the number of double-page spread input unit 208. When the double-page spread assignment unit 209 determines that the two numbers are not the same (NO in step S414), the processing proceeds to step S415. On the other hand, when the double-page spread assignment unit 209 determines that the two numbers are the same (YES in step S414), the processing proceeds to step S418. For example, as illustrated in FIG. 6A, the number of scenes is 8 and the number of inputs of the number of double-page spread input unit 208 is 8, the processing proceeds to step S418.

In step S415, the double-page spread assignment unit 209 determines whether the number of scenes in the scene division in step S407 is smaller than the number of double-page spreads input from the number of double-page spread input unit 208 (the number of templates used for the album). When the double-page spread assignment unit 209 determines that the number of scenes is not smaller (greater) than the number of double-page spreads (NO in step S415), the processing proceeds to step S417. On the other hand, when the double-page spread assignment unit 209 determines that the number of scenes is smaller than the number of double-page spreads (YES in step S415), the processing proceeds to step S416. As illustrated in FIG. 6A, when the number of scenes is 8 and the number input by the number of double-page spread input unit 208 is 10, the processing proceeds to step S416. In steps S416 and S417, the double-page spread assignment unit 209 performs processing of changing the number of image groups (the number of scenes) into which images are temporarily divided in step S407 (illustrated in FIG. 6A) so that the number of image groups is equal to the number of double-page spreads. The processing will be described in detail below.

Figure 6B:
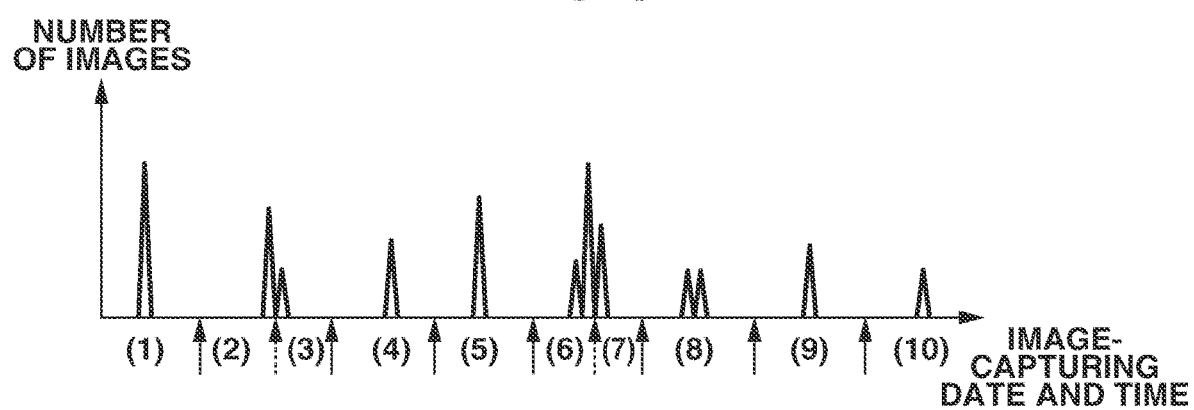

In step S416, the double-page spread assignment unit 209 performs sub scene division. The sub scene division refers to further dividing the image groups according to the scenes when the number of image groups is smaller than the number of double-page spreads of the album. The following description will be made centering on a case where the number of image groups is 8, as illustrated in FIG. 6A, and the number of double-page spreads of the specified album is 10. FIG. 6B illustrates a result of performing the sub scene division on the image groups into which the images are divided through the scene division illustrated in FIG. 6A. The number of image groups is increased to 10 by dividing the image groups at positions indicated by dashed-line arrows.

Division criteria will be described below. In the division illustrated in FIG. 6A, image groups having many images are searched. In this case, to increase the number of image groups from 8 to 10, two image groups having many images are determined. Referring to FIG. 6A, the image group 5 has the largest number of images, and the image groups 1 and 2 have the second largest number of images. The image groups 1 and 2 have the same number of images. However, since the image group 2 has a larger time difference between the first and the last images than the image group 1, the image group 2 is determined as a division target. Therefore, the image groups 2 and 5 are to be divided.

The division of the image group 2 will be described below. The image group 2 has two peaks of the number of images which were captured on different dates. Therefore, the division is performed at the dashed-line-arrow position illustrated in FIG. 6B corresponding to the position between the two peaks. The division of the image group 5 will be described below. The image group 5 has three peaks of the number of images which were captured on three consecutive dates. Although the image-capturing date changes at two positions, the division is performed at the dashed-line-arrow position illustrated in FIG. 6B to reduce the difference in the number of images after the image division. As described above, the number of image groups has been changed from 8 to 10. In this example, the division is made at the positions where the image-capturing date changes. However, if many images were captured on a certain single date, the division may be performed at a position where the time difference is the largest in the single date.

Figure 6C:
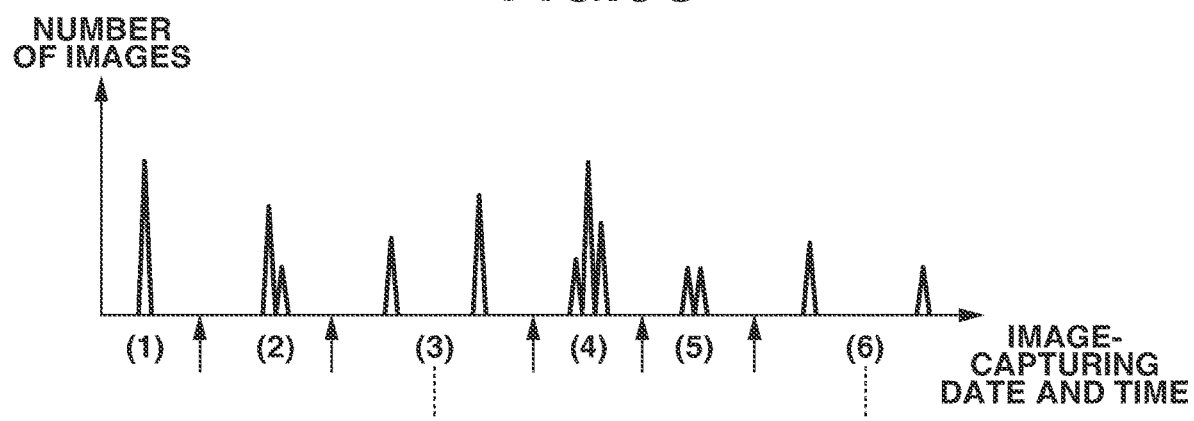

In step S417, the double-page spread assignment unit 209 performs scene merging. The scene merging refers to merging image groups, into which images are divided according to scenes, when the number of image groups is larger than the number of double-page spreads of the album. FIG. 6C illustrates a result of preforming the scene merging on the image groups illustrated in FIG. 6A. The number of image groups has been reduced to 6 by performing the scene merging at dashed-line positions.

Merging criteria will be described below. In the division illustrated in FIG. 6A, image groups having a small number of images are searched. In this case, to reduce the number of image groups from 8 to 6, two image groups having a small number of images are determined. Referring to FIG. 6A, the image group 8 has the smallest number of images, and the image groups 3 and 7 have the second smallest number of images (the same number of images). However, since the image group 8 adjacent to the image group 7 is a merging target, the image group 3 is also determined as a merging target. As a result, merging is to be performed on the image groups 8 and 3.

The merging of the image group 3 will be described below. When comparing the time difference from the image group 2 (preceding the image group 3) with the time difference from the image group 4 (following the image group 3), the time difference from the image group 4 is smaller than the time difference from the image group 2. Therefore, as indicated by the dashed-line position illustrated in FIG. 6C, the image group 3 is merged with the image group 4. The merging of the image group 8 will be described below. Since there is no image group following the image group 8, the image group 8 is merged with the preceding image group 7, as indicated by the dashed-line position illustrated in FIG. 6C.

In step S418, the double-page spread assignment unit 209 performs the double-page spread assignment. As a result of the processing in steps S414 to S417, the number of image groups is equal to the specified number of double-page spreads. The double-page spread assignment unit 209 assigns each of a plurality of image groups to each double-page spread. The double-page spread assignment unit 209 performs the assignment so that a plurality of image groups is not assigned to a certain double-page spread. More specifically, the double-page spread assignment unit 209 assigns the first and subsequent image groups in order of the image-capturing date and time to the first and subsequent double-page spreads, respectively.

In step S419, the image selection unit 210 selects images to be laid out on a specific double-page spread from the image group corresponding to the specific double-page spread. An example will be described below in which four pieces of image data are selected from the image group assigned to a certain double-page spread, with reference to FIGS. 9A to 9I.

Referring to FIG. 9A, the section between the start and the end indicates the time difference (image-capturing period of an image group) between the image-capturing date and time of the first piece of image data and the image-capturing date and time of the last piece of image data in the image group assigned to the double-page spread. A method for selecting the first piece of image data will be described below with reference to FIG. 9B. A template has one main slot 1002. Therefore, image data for the main slot is selected as the first piece of image data. Of a plurality of pieces of image data corresponding to the image-capturing period of the image group illustrated in FIG. 9B, a piece of image data to which the highest score for the main slot is assigned in step S412 is selected. Pieces of image data for the sub slots are selected as the second and subsequent pieces of image data.

According to the present exemplary embodiment, the image selection is performed so that most of the images may not be selected from images captured during a specific part of the image-capturing period of the image group. A method for subdividing the image-capturing period of the image group according to the present exemplary embodiment will be described below. As illustrated in FIG. 9C, the image-capturing period of the image group is divided into two. As illustrated in FIG. 9D, the second piece of image data is selected from the solid-line image-capturing period during which the first piece of image data is not selected. Image data having the highest score for the sub slot out of a plurality pieces of image data corresponding to the solid-line image-capturing period illustrated in FIG. 9D is selected.

As illustrated in FIG. 9E, two sections into which the image-capturing period is divided as illustrated in FIG. 9D are each divided into two. As illustrated in FIG. 9F, out of a plurality of pieces of image data corresponding to the solid-line sections of the image-capturing period from which the first and second pieces of image data are not selected, image data having the highest score for the sub slot is selected as the third piece of image data.

An example will be described in which the fourth piece of image data is selected in a case where there is no image data in the image-capturing period from which image data is to be selected and therefore image data cannot be selected. FIG. 9G illustrates an example in which no image data exists in the shaded section of the image-capturing period when the fourth piece of image data is to be selected from the shaded section of the image-capturing period from which image data has not yet been selected. In this case, as illustrated in FIG. 9H, the sections into which the image-capturing period of the image group is divided are each divided into two. As illustrated in FIG. 9I, out of a plurality of pieces of image data corresponding to the solid-line sections of the image-capturing period from which the first to third pieces of image data are not selected, image data having the highest score for the sub slot is selected as the fourth piece of image data.

The flowchart illustrated in FIG. 4 will be described again below. In step S420, the image layout unit 212 determines the image layout. An example will be described in which the template input unit 211 inputs the group of templates illustrated in FIGS. 10A to 10P for a certain double-page spread according to the specified template information.

For example, 3 is specified as the number of slots for the input template. Three selected pieces of image data are assumed to be vertically or horizontal arranged based on the image-capturing date and time, as illustrated in FIG. 10Q. In this case, image data 1005 is image data for the main slot, and image data 1006 and 1007 are image data for the sub slots. According to the present exemplary embodiment, image data with the earliest image-capturing date and time is laid out at the upper left of the template, and image data with the latest image-capturing date and time is laid out at the lower right of the template. Referring to FIG. 10Q, since the image data 1005 for the main slot has the latest image-capturing date and time, the templates illustrated in FIGS. 10I to 10L are candidates. The image data 1006 that is the older image data for the sub slot is a vertical image, and the image data 1007 that is the newer image data for the sub slot is a horizontal image. As a result, the template illustrated in FIG. 10J is determined as a template most suitable for the three selected pieces of image data, and the layout is determined. In step S420, the image layout unit 212 determines which image is to be laid out on which slot of which template.

In step S421, the image correction unit 214 performs the image correction. When the image correction ON condition is input from the image correction condition input unit 213, the image correction unit 214 performs the image correction. The image correction includes dodging process correction (luminance correction), red-eye correction, and contrast correction. When the image correction OFF condition is input from the image correction condition input unit 213, the image correction unit 214 does not perform the image correction. The image correction can also be performed, for example, on converted image data with the size of the short-side 1200 pixels and the sRGB color space.

In step S422, the layout information output unit 215 generates the layout information. The image layout unit 212 lays out the image data on which the image correction in step S421 is performed on each slot of the template determined in step S420. In this case, the image layout unit 212 changes the scale of the image data to be laid out, according to the size information about the slot. Then, the layout information output unit 215 generates bit map data in which image data is laid out on the template.

In step S423, the layout information output unit 215 determines whether the processing in steps S419 to S422 is completed for all of the double-page spreads. When the layout information output unit 215 determines that the processing is not completed (NO in step S423), the processing returns to step S419. On the other hand, when the layout information output unit 215 determines that the processing is completed (YES in step S423), the automatic layout processing illustrated in FIG. 4 ends.

Figure 11:
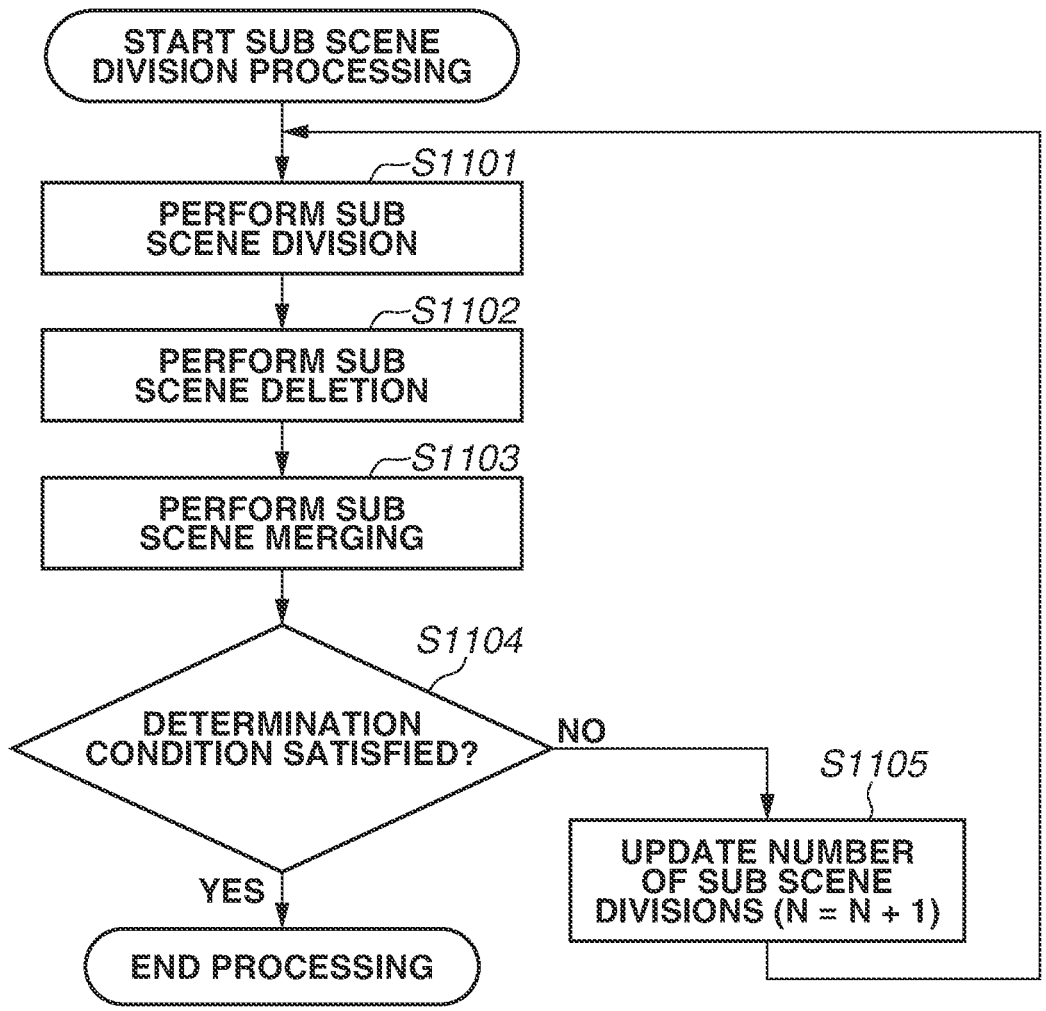
FIG. 11 is a flowchart illustrating sub scene division processing according to one or more aspects of the present disclosure.

The sub scene division in step S416 illustrated in FIG. 4 will be described in detail below. FIG. 11 is a flowchart illustrating details of the sub scene division processing by the double-page spread assignment unit 209 of the album creation application according to the present exemplary embodiment. The sub scene division processing will be described below with reference to FIG. 11.

In step S1101, the double-page spread assignment unit 209 performs the sub scene division. As described in step S416 illustrated in FIG. 4, the double-page spread assignment unit 209 divides an image group having images at the boundary between dates as a sub scene division method. For two image groups having the same number of images, the double-page spread assignment unit 209 divides an image group having a larger time difference between the first and the last images. The number of double-page spreads is set as the initial value of the number of sub scenes N. However, as described below, the number of sub scenes N may be larger than the number of double-page spreads in some cases.

The double-page spread assignment unit 209 generates scene information including information about each of the current sub scenes into which the images are divided, and updates the scene information each time the number of sub scenes is changed (described below). FIG. 12A illustrates an example of the scene information when the number of sub scenes N is 14. A scene ID indicates a specific ID assigned to each sub scene (in this example, the scene ID corresponds to the numbers from 1 to 14).

The scene information illustrated in FIG. 12A includes the number of images, the number of objects, and the importance level of each sub scene, and the image-capturing period in each sub scene. The scene information also includes the time difference between the last image-capturing time in each sub scene and the first image-capturing time in the sub scene with the following scene ID in the list illustrated in FIG. 12A. The number of images indicates the number of captured images included in each sub scene into which the images are divided. The number of objects indicates the total number of objects in images included in each sub scene. In this case, the number of objects corresponds to, for example, the number of faces detected by the image analysis unit 204 in step S403 and the number of objects for each object type recognized in step S405. The importance level indicates the sum total value of the importance level of each piece of image data included in each sub scene based on the weighting corresponding to a specified object. According to the present exemplary embodiment, in the main character setting in step S410 and the priority mode setting in step S411 illustrated in FIG. 4, a high importance level is set to images including the main character person or the subject (object) of the type set in the priority mode setting. For example, the importance level "5" is set to image data including the main character person or an image including an object type to which priority is given. The importance level "10" is set to an image including both the main character person and an object type to which priority is given. The importance level "1" is set to an image including a person who is not the main character or an object type to which priority is not given. Then, the sum total value of the importance levels of images included in the image group is calculated and stored in the scene information. More specifically, a scene including a larger number of pieces of image data including many main characters or objects to which priority is given can be more likely to be determined as an important scene. The importance level only needs to define the degree for determining the importance of the scene, and not limited to the main character or object type. For example, the importance level may be calculated by using a slider bar of each object type as a priority mode specification slider (not illustrated). As sliders bar of object types, the person, pet, and flower slider bars are displayed. The user can specify the setting value of each of the slider bars in 3 steps "High", "Normal", and "Low". For example, when the person slider bar is set to "Normal", the pet slider bar is set to "High", and the flower slider bar is set to "Low", the importance level "5" is set to image data including a person, or the importance level "10" is set to image data including a pet. The importance level "15" is set to image data including both a person and a pet, and the importance level "1" is set to image data including objects other than a person or pet. Then, the sum total value of the importance levels of images included in the image group is calculated and stored in the scene information. More specifically, a scene including a larger number of pieces of image data including a larger number of persons than a number of flowers or a larger number of pets than a number of persons is more likely to be determined as an important scene. If the user manually sets the importance level by using the sliders in this way, an important scene can be determined according to the user's intention. Although, in the present exemplary embodiment, an important scene is determined based on three different objects and 3-step setting values, the processing is not limited thereto. The importance level may be recognized as an object from image data, and a plurality of importance level setting values may be set.

The importance level may be calculated based on the number of persons derived from the number of person faces. The importance level "5" is set to image data including at least one person. The importance level "1" is set to image data including no person. Then, the sum total value of the importance levels of images included in the image group is calculated and stored in the scene information. More specifically, a scene including a larger number of pieces of image data including many faces can be more likely to be determined as an important scene.

The importance level may be calculated by using a slider bar of each personal ID as a main character setting slider (not illustrated). With the slider bar of each personal ID, the user can specify each setting value in 3 steps "High", "Normal", and "Low". For example, when ID 1 is set to "Normal", ID 2 is set to "High", and ID 3 is set to "Low", the importance level "5" is set to image data including a person with ID 1, or the importance level "10" is set to image data including a person with ID 2. The importance level "15" is set to image data including both the person with ID 1 and the person with ID 2, or the importance level "1" is set to image data including a person with ID 3 or other persons. Then, the sum total value of the importance levels of images included in the image group is calculated and stored in the scene information. More specifically, a scene including a larger number of pieces of image data including the person with ID 1 than the number of pieces of image data including the person with ID 3 and other persons, and a scene including a larger number of pieces of image data including the person with ID 2 than the number of pieces of image data including the person with ID 1 can be more likely to be determined to be an important scene.

When the image data includes images clipped from moving image data, the number of pieces of image data increases, possibly increasing the importance level of the scene. Therefore, an identifier for identifying whether the data is moving image data may be acquired, and a value for the number of images clipped from the moving image may be thinned out from the importance level of the scene. For example, the importance level of image data clipped from a moving image is set to "0.1", and the importance level of image data not clipped from a moving image is set to "1". Then, the sum total value of the importance levels of pieces of image data is calculated. More specifically, a scene including many pieces of image data clipped from a moving image can be prevented from being incorrectly determined to be an important scene.

A "Period" included in the scene information is the image-capturing period of images included in each image group (sub scene) into which images are divided, and indicates the time difference between the first and the last image data when the image data is laid out in order of the image-capturing time.

A "Time Difference" included in the scene information refers to the time difference between image groups (sub scenes) into which images are divided, and indicates the image-capturing interval between the end of the target sub scene and the top of the following sub scene when the image data is laid out in order of the image-capturing time. A "Deletion Target" and a "Scene Merging ID" illustrated in FIG. 12A will be described below.

In step S1102, the double-page spread assignment unit 209 deletes a sub scene satisfying a predetermined deletion condition from the scene information. According to the present exemplary embodiment, the "importance level" 0 of the scene information is regarded as a condition for exclusion from the assignment to the double-page spread. For example, the importance level 0 is set to a scene ID "11" illustrated in FIG. 12A. For this reason, the scene ID "11" satisfies the above-described condition and therefore is a sub scene to be deleted. As described above, when an important object type is identified when the user specifies the priority mode, and an image including the subject of the object type is included in an image group, the importance level of the image group is not 0. Therefore, the image including the subject of the important object type is not to be deleted.

In step S1103, when the number of sub scenes is larger than the number of double-page spreads, the double-page spread assignment unit 209 merges (combines) the sub scenes. The double-page spread assignment unit 209 repeats the sub scene merging until the number of scenes becomes equal to the number of double-page spreads. According to the present exemplary embodiment, for example, the specified number of double-page spreads is 10. As illustrated in FIG. 12A, the double-page spread assignment unit 209 excludes the sub scene with the scene ID "11" to be deleted and performs the scene merging on thirteen remaining sub scenes. The method for merging the sub scenes is a similar procedure to the scene merging described in step S417 illustrated in FIG. 4, and the description thereof will be omitted. Any scene including a few images or any scene having a small time difference may be selected as a sub scene to be merged. For example, if the result of the scene classification is identical, the sub scene to be merged may be a sub scene including a few images. On the other hand, if the result of the scene classification is different, the sub scene to be merged may be a sub scene having a small time difference. The "Scene Merging ID" column illustrated in FIG. 12A indicates the result of the sub scene merging. Referring to FIG. 12A, scene IDs "2" and "3" indicate sub scenes to be merged into a scene with a scene merging ID "2". FIG. 12B illustrates the result of the processing in steps S1102 and S1103. As illustrated in FIG. 12B, as a result of the sub scene merging, the scene merging ID illustrated in FIG. 12A has been changed to the scene ID illustrated in FIG. 12B. The scene information is updated with the scene merging.

In step S1104, the double-page spread assignment unit 209 determines whether the scene information of each sub scene satisfies the condition for an important scene. More specifically, the double-page spread assignment unit 209 evaluates each sub scene by using the scene information, and determines whether the evaluation satisfies a predetermined condition.

According to the present exemplary embodiment, the double-page spread assignment unit 209 evaluates a scene by using the scene information corresponding to the scene, and determines whether the scene is an important scene. For example, day-to-day living scenes including a larger number of images including a main character as an image-capturing target and travel scenes in a longer image-capturing period and a higher image-capturing frequency are determined as more important image groups (scenes). As a result, such scenes can be likely to remain in a double-page spread as scenes which deserve to be laid out on the double-page spread. On the other hand, scenes including a smaller number of images including a main character and objects and sudden scenes in a shorter image-capturing period and a lower capturing frequency are determined to be less important scenes and can be likely to be deleted.

When the double-page spread assignment unit 209 determines that the scene information does not satisfy the condition for an important scene (NO in step S1104), the processing proceeds to step S1105. In step S1105, the double-page spread assignment unit 209 sets the number of sub scenes N=N+1, N being the number of sub scenes. More specifically, in step S1105, the double-page spread assignment unit 209 changes the number of sub scenes, performs the processing in steps S1101 to S1103 again, and performs the determination in step S1104 again. However, when the number of sub scenes is changed, the division and merging may be endlessly repeated and unable to be ended. Therefore, an upper limit is set for the number of sub scenes N. On the other hand, when the double-page spread assignment unit 209 determines that the number of sub scenes N has reached the upper limit (YES in step S1104), the double-page spread assignment unit 209 ends the processing illustrated in FIG. 11 without resetting the number of sub scenes N.

According to the present exemplary embodiment, the condition for the determination in step S1104 is as follows. In the scene information about each sub scene, a condition for an important scene is predetermined as follows: the number of images is 10 or more, the number of objects is 10 or more, the importance level is 20 or higher, the image-capturing period is 1.5 hours or longer, and the time difference is 12 hours or longer. Referring to the example illustrated in FIG. 12B, the condition is satisfied by all of the ten sub scenes. Therefore, in step S1104, the double-page spread assignment unit 209 determines that the scene information about each sub scene satisfies the condition for an important scene, and ends the processing illustrated in FIG. 11. More specifically, when the double-page spread assignment unit 209 determines that all of a plurality of sub scenes (a plurality of image groups) satisfy the condition for an important scene, the double-page spread assignment unit 209 determines the plurality of sub scenes (the plurality of image groups) as candidates to be laid out on templates, the number of which is equal to the specified number of double-page spreads.

As described above, when the sub scene division processing is completed, the scene information about all of the sub scenes satisfies the condition for an important scene. More specifically, when the sub scene division processing is completed, all of the sub scenes can be determined to be important scenes. Since the number of sub scenes and the specified number of double-page spreads are equal to each other as described above, the double-page spreads are respectively associated with the sub scenes in step S416 illustrated in FIG. 4. A scene determined to be important can be likely to remain in the double-page spread as a scene which deserves to be laid out on the double-page spread, making it possible to prevent missing of important scenes.

According to the present exemplary embodiment, as described above, an important object type is identified based on the priority mode specified by the user, and a high importance level is set to the image group including images including a subject of the object type. Therefore, according to the present exemplary embodiment, based on the priority mode specified by the user, a subject specified as an important object type by the user is likely to be included in all of the image groups into which the images are divided. As a result, such a possibility can be reduced that images including a subject of the type considered as important by the user are not included in the image group or that only a few such images are included in the image group.

According to the above-described exemplary embodiment, as a method for including as many images including a subject of the object type specified by the user as possible in each of a plurality of image groups into which images in a folder specified by the user are divided, a high importance level is given to images including an object of the object type.

However, the method is not limited thereto. For example, as the condition for the determination in step S1104, the condition for an important image group (scene) may be that an image group includes a predetermined number of images including a subject of the object type specified by the user. If the predetermined number is set to 1, for example, at least one image including a subject (important object) of the object type specified by the user can be included in each of a plurality of image groups into which images in a folder specified by the user are divided.

Even if at least one image including an important object can be included in each of a plurality of image groups according to the above-described exemplary embodiment, the image may not be selected in the image selection in step S419. Therefore, as the condition for the image selection in step S419, there may be provided a condition that at least one image including an important object is selected.

The processing illustrated in FIG. 11 may be executed in the scene merging in step S417. In this case, a value larger than the number of scenes into which the images are divided in step S407, i.e., the number of double-page spreads, is set as the initial value of the number of sub scenes N. For this reason, when processing in step S1101 is performed for the first time, the sub scene division is not performed.

According to the first exemplary embodiment, the scene information includes the number of images, the number of objects, importance level, image-capturing period, and time difference of each sub scene. These pieces of scene information are used in the determination in step S1104. However, the determination in step S1104 may be performed by using text information of image data as the determination condition. For example, when text information can be acquired from the image data of a captured scene, the text information is stored as scene information. In step S1104, the double-page spread assignment unit 209 determines whether the text information of a captured scene is text information representing a predetermined place name such as a tourist spot, or whether the text information coincides with text information representing user's favorite words. When the double-page spread assignment unit 209 determines that the text information about a captured scene is text information representing a predetermined place name, or that the text information coincides with text information representing user's favorite words, the double-page spread assignment unit 209 determines the scene as an important scene.

When personal information can be acquired from the image data, the personal information is stored as scene information. In this case, the personal information refers to, for example, name and address. If information identifying a specific person, such as name and address, is considered to be not suitable for image data to be laid out on a double-page spread, the double-page spread assignment unit 209 determines the scene as an unimportant scene when the ratio of the number of pieces of the image data of such a type to the number of pieces of image data in each scene is equal to or larger than a predetermined threshold value. For example, in step S1104, the double-page spread assignment unit 209 may set the "importance level" 0 to a scene in which the ratio of the image data other than the image data to be laid out on a double-page spread is 100% and set the scene as a scene to be deleted in steps S1102.

Although, in the above-described example, the text information and the personal information acquired from the image data are used as conditions for the determination in step S1104, the condition is not limited thereto. Other information that can be acquired from the image data may also be used as the condition for the determination in step S1104.

According to the exemplary embodiment, a plurality of images in a folder specified by the user is divided into a plurality of scenes (image groups), and processing is performed so that the number of double-page spreads is equal to the number of image groups. However, the processing is not limited thereto. For example, the double-page spread assignment unit 209 may determine whether the plurality of images satisfies the condition as an image group (the determination condition in step S1104) in ascending or descending order of image-capturing date and time. Then, the double-page spread assignment unit 209 may end the image group determination processing when the number of image groups satisfying the above-described condition reaches the number of double-page spreads. In this case, a condition that images including an important object are included in the image group may be used as the above-described condition.

OTHER EMBODIMENTS

Embodiment(s) or other aspects of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, firmware, hardware, other component, or the like (e.g., central processing unit (CPU), micro processing unit (MPU)), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2016-239741, filed Dec. 9, 2016, which is hereby incorporated by reference herein in its entirety.

What is claimed is:

1. An image processing method executed by at least one processor, the method comprising:
   receiving a user instruction related to an object type;
   dividing a plurality of images into a plurality of image groups based on an object type corresponding to the received user instruction and on time information indicating a time corresponding to each of the plurality of images,
   wherein a number of the plurality of image groups is a number of a plurality of templates, and the number is determined according to a user instruction; and
   laying out at least one image included in each of the plurality of image groups on a template corresponding to each of the plurality of image groups out of the plurality of templates,
   wherein, in the dividing, the plurality of images is divided so that an image including an object corresponding to the object type is included in each of the plurality of image groups.

2. The image processing method according to claim 1,
   wherein the dividing includes:
   temporarily dividing the plurality of images into a plurality of image groups based on the time information indicating a time corresponding to each of the plurality of images; and
   executing, in a case where a number of the plurality of image groups into which the plurality of images differs from the number, predetermined processing of changing the number of the plurality of image groups so that the number of the plurality of image groups is equal to the number, and
   wherein the predetermined processing is executed so that an image including the object corresponding to the object type is included in each of the plurality of image groups, based on the object type corresponding to the received user instruction.

3. The image processing method according to claim 2,
   wherein the predetermined processing includes:
   increasing the number of the plurality of image groups in a case where the number of the plurality of image groups is smaller than the number; and
   decreasing the number of the plurality of image groups in a case where the number of the plurality of image groups is greater than the number.

4. The image processing method according to claim 3, wherein, in the increasing, one or a plurality of images included in at least one of the plurality of image groups is determined as a new image group.

5. The image processing method according to claim 2, wherein, in the executing, an image-capturing period of at least one of the plurality of image groups is identified based on the time information about images included in each of the plurality of image groups, and an image group on which the predetermined processing is to be executed is selected out of the plurality of image groups based on the identified image-capturing period.

6. The image processing method according to claim 3, wherein, in the decreasing, one or a plurality of images included in at least one of the plurality of image groups is determined as an image or images to be included in another image group out of the plurality of image groups.

7. The image processing method according to claim 6, wherein, in the decreasing, a time difference indicated by the time information between two image groups out of the plurality of image groups is identified, and the other image group is selected based on the identified difference.

8. The image processing method according to claim 1, further comprising:
   classifying each of the plurality of image groups into which the plurality of images is divided into any one of a plurality of scene types; and selecting an image to be laid out in the laying out from each of the plurality of image groups, based on a criterion corresponding to the scene types of each of the plurality of image groups.

9. The image processing method according to claim 1, wherein the dividing includes:
   evaluating each of the plurality of image groups based on information about the plurality of image groups; and
   determining, in a case where an evaluation in the evaluating satisfies a predetermined condition, the plurality of image groups as candidates to be laid out in the laying out,
   wherein, in the evaluating, each of the plurality of image groups is evaluated so that an evaluation of a first image group including an image including the object corresponding to the object type is higher than an evaluation of a second image group not including an image including the object corresponding to the object type.

10. An image processing apparatus comprising:
    a processor and memory that causes the image processing apparatus to:
    receive a user instruction related to an object type;
    divide a plurality of images into a plurality of image groups based on the object type corresponding to the received user instruction and on time information indicating a time corresponding to each of the plurality of images,
    wherein a number of the plurality of image groups is a number of a plurality of templates, and the number is determined according to a user instruction; and
    lay out at least one image included in each of the plurality of image groups on a template corresponding to each of the plurality of image groups out of the plurality of templates,
    wherein the plurality of images is divided so that an image including an object corresponding to the object type is included in each of the plurality of image groups.

11. The image processing apparatus according to claim 10,
    wherein the image processing apparatus temporarily divides the plurality of images into a plurality of image groups based on the time information indicating a time corresponding to each of the plurality of images, and executes, in a case where a number of the plurality of image groups differs from the number, predetermined processing of changing the number of the plurality of image groups so that the number of the plurality of image groups is equal to the number, and
    wherein the predetermined processing is executed so that an image including the object corresponding to the object type is included in each of the plurality of image groups, based on the object type corresponding to the received user instruction.

12. The image processing apparatus according to claim 11, wherein the predetermined processing includes:
    increasing the number of the plurality of image groups in a case where the number of the plurality of image groups is smaller than the number; and
    decreasing the number of the plurality of image groups in a case where the number of the plurality of image groups is greater than the number.

13. The image processing apparatus according to claim 12, wherein one or a plurality of images included in at least one of the plurality of image groups is determined as a new image group.

14. The image processing apparatus according to claim 11, wherein an image-capturing period of at least one of the plurality of image groups is identified based on the time information about images included in each of the plurality of image groups, and an image group on which the predetermined processing is to be executed is selected out of the plurality of image groups based on the identified image-capturing period.

15. The image processing apparatus according to claim 12, wherein one or a plurality of images included in at least one of the plurality of image groups is determined as an image or images to be included in another image group out of the plurality of image groups.

16. The image processing apparatus according to claim 15, wherein a time difference indicated by the time information between two image groups out of the plurality of image groups is identified, and the other image group is selected based on the identified difference.

17. The image processing apparatus according to claim 10,
    wherein a number of the plurality of image groups is a number of a plurality of templates, and
    wherein at least one image included in each of the plurality of image groups is laid out on a template corresponding to each of the plurality of image groups out of the plurality of templates.

18. A non-transitory storage medium storing a program for causing a computer to execute an image processing method comprising:
    receiving a user instruction related to an object type;
    dividing a plurality of images into a plurality of image groups based on an object type corresponding to the received user instruction and on time information indicating a time corresponding to each of the plurality of images,
    wherein a number of the plurality of image groups is a number of a plurality of templates, and the number is determined according to a user instruction; and
    laying out at least one image included in each of the plurality of image groups on a template corresponding to each of the plurality of image groups out of the plurality of templates,
    wherein, in the dividing, the plurality of images is divided so that an image including an object corresponding to the object type is included in each of the plurality of image groups.

19. An image processing method executed by at least one processor, the method comprising:
    receiving a user instruction related to an object type;
    dividing a plurality of images into a plurality of image groups based on an object type corresponding to the received user instruction and on time information indicating a time corresponding to each of the plurality of images; and
    laying out at least one image included in each of the plurality of image groups on a template corresponding to each of the plurality of image groups,
    wherein the dividing includes:
    temporarily dividing the plurality of images into a plurality of image groups based on the time information indicating a time corresponding to each of the plurality of images;
    increasing a number of the plurality of image groups, in a case where the number of the plurality of image groups is smaller than a predetermined number; and
    decreasing the number of the plurality of image groups, in a case where the number of the plurality of image groups is greater than the predetermined number,
    and wherein, the increasing and the decreasing are executed, so that an image including the object corresponding to the object type is included in each of the plurality of image groups.

20. An image processing method executed by at least one processor, the method comprising:
    receiving a user instruction related to an object type;
    dividing a plurality of images into a plurality of image groups based on an object type corresponding to the received user instruction and on time information indicating a time corresponding to each of the plurality of images;
    evaluating each of the plurality of image groups based on information about the plurality of image groups; and
    laying out, in a case where an evaluation in the evaluating satisfies a predetermined condition, at least one image included in each of the plurality of image groups on a template corresponding to each of the plurality of image groups,
    wherein, in the evaluating, each of the plurality of image groups is evaluated so that an evaluation of a first image group including an image including the object of the object type is higher than an evaluation of a second image group not including an image including the object of the object type.

21. The image processing method according to claim 20,
    wherein a number of the plurality of image groups is a number of a plurality of templates, and
    wherein, in the laying out, at least one image included in each of the plurality of image groups is laid out on a template corresponding to each of the plurality of image groups out of the plurality of templates.

22. The image processing method according to claim 21, wherein the number of the plurality of templates is a number according to the user instruction.

* * * * *